(12) United States Patent
Shi et al.

(10) Patent No.: US 11,037,348 B2
(45) Date of Patent: Jun. 15, 2021

(54) METHOD AND APPARATUS FOR DISPLAYING BUSINESS OBJECT IN VIDEO IMAGE AND ELECTRONIC DEVICE

(71) Applicant: Beijing SenseTime Technology Development Co., Ltd, Beijing (CN)

(72) Inventors: Jianping Shi, Beijing (CN); Qing Luan, Beijing (CN); Qinqin Xu, Beijing (CN); Lei Wang, Beijing (CN)

(73) Assignee: BEIJING SENSETIME TECHNOLOGY DEVELOPMENT CO., LTD, Beijing (CN)

( * ) Notice: Subject to any disclaimer, the term of this patent is extended or adjusted under 35 U.S.C. 154(b) by 0 days.

(21) Appl. No.: 15/847,172

(22) Filed: Dec. 19, 2017

(65) Prior Publication Data

US 2018/0108165 A1    Apr. 19, 2018

Related U.S. Application Data

(63) Continuation of application No. PCT/CN2017/098027, filed on Aug. 18, 2017.

(30) Foreign Application Priority Data

Aug. 19, 2016 (CN) .......................... 201610694625.1
Aug. 19, 2016 (CN) .......................... 201610694812.X

(51) Int. Cl.
*G06T 11/60* (2006.01)
*G06K 9/20* (2006.01)
(Continued)

(52) U.S. Cl.
CPC ............ *G06T 11/60* (2013.01); *G06K 9/2063* (2013.01); *G06K 9/2072* (2013.01); *G06K 9/481* (2013.01);
(Continued)

(58) Field of Classification Search
CPC ... G06T 11/60; G06T 7/73; G06T 7/60; G06T 11/20; G06T 2207/10016; G06T 7/11;
(Continued)

(56) References Cited

U.S. PATENT DOCUMENTS 5,576,778 A * 11/1996 Fujie .................... G02C 13/003
                                                                33/200
7,239,277 B2 * 7/2007 Fullerton .............. G01S 5/0289
                                                                342/458

(Continued)

FOREIGN PATENT DOCUMENTS

| CN | 101339549 A | 7/2009 |
| CN | 101364368 A | 11/2009 |
| CN | 103702211 A | 2/2014 |

OTHER PUBLICATIONS

International Search Report of PCT/CN2017/098027 dated Nov. 6, 2017, 2 pp.

*Primary Examiner* — Charles L Beard
(74) *Attorney, Agent, or Firm* — Lathrop GPM LLP

(57) ABSTRACT

Embodiments of the present disclosure provide a method and an apparatus for displaying a business object in a video image and an electronic device. The method for displaying a business object in a video image includes: detecting at least one target object from a video image, and determining a feature point of the at least one target object; determining a display position of a to-be-displayed business object in the video image according to the feature point of the at least one target object; and drawing the business object at the display position by using computer graphics. According to the embodiments of the present disclosure, the method and apparatus are conductive to saving network resources and system resources of a client.

15 Claims, 6 Drawing Sheets

(51) Int. Cl.
   *G06N 3/04* (2006.01)
   *G06N 3/08* (2006.01)
   *G06T 7/73* (2017.01)
   *G06K 9/48* (2006.01)
   *G06K 9/62* (2006.01)
   *G06Q 30/02* (2012.01)
   *G06T 7/60* (2017.01)
   *G06T 11/20* (2006.01)

(52) U.S. Cl.
   CPC ......... *G06K 9/6256* (2013.01); *G06N 3/0454* (2013.01); *G06N 3/08* (2013.01); *G06N 3/084* (2013.01); *G06Q 30/0251* (2013.01); *G06Q 30/0277* (2013.01); *G06T 7/60* (2013.01); *G06T 7/73* (2017.01); *G06T 11/20* (2013.01); *G06K 2209/21* (2013.01); *G06T 2207/10016* (2013.01)

(58) Field of Classification Search
   CPC ....... G06T 2207/30236; G06T 2210/12; G06T 2210/22; G06T 7/002; G06T 7/97; G06Q 30/0251; G06Q 30/0277; G06K 9/2063; G06K 9/2072; G06K 9/481; G06K 9/6256; G06K 2209/21; G06F 16/00; G06F 16/951; G06F 16/9535; G06F 16/285; G06F 3/011; G06F 3/017; G06F 3/147; G06F 16/3334; G06F 16/5838; G06F 17/27; G06F 21/6245; G06F 16/172; G06F 16/176; G06F 16/1805; G06F 16/182; G06F 16/22; G06F 16/2282; G06F 16/2365; G06F 16/24575; G06F 16/24578; G06F 16/27; G06F 16/313; G06F 16/41; G06F 16/432; G06F 16/435; G06F 16/438; G06F 16/447; G06F 16/45; G06F 16/48; G06F 16/489; G06F 16/5866; G06F 16/7867; G06F 16/955; G06F 16/957; G06F 17/00; G06F 17/16; G06F 17/277; G06F 17/2785; G06F 17/2881; G06F 19/325; G06F 21/60; G06F 21/62; G06F 2207/4824; G06F 3/0482; G06F 7/00; G06F 13/00; G06F 16/2465; G06F 16/29; G06F 16/33; G06F 16/3326; G06F 16/335; G06F 16/337; G06F 16/358; G06F 16/433; G06F 16/4387; G06F 16/51; G06F 16/532; G06F 16/54; G06F 16/5846; G06F 16/632; G06F 16/685; G06F 16/902; G06F 16/9038; G06F 19/94; G06F 16/9536; G06F 16/9554; G06F 16/9558; G06F 16/958; G06F 17/142; G06F 17/153; G06F 17/18; G06F 17/212; G06F 17/218; G06F 17/24; G06F 17/2705; G06F 17/2765; G06F 17/278; G06F 19/00; G06F 1/32; G06F 21/316; G06F 21/51; G06F 21/602; G06F 2207/3824; G06F 2221/2119; G06F 3/048; G06F 3/0488; G06F 3/0604; G06F 3/0653; G06F 3/0673; G06F 5/012; G06F 7/08; G06F 7/483; G06F 8/41; G06F 9/451; G06F 9/4881; G06F 9/5027; G06F 9/5072; G06N 3/08; G06N 20/00; G06N 3/04; G06N 3/0454; G06N 3/063; G06N 7/005; G06N 3/0445; G06N 3/084; G06N 20/10; G06N 3/02; G06N 3/0472; G06N 20/20; G06N 3/0436; G06N 3/049; G06N 3/082; G06N 3/10; G06N 3/123; G06N 3/126; G06N 5/02; G06N 5/04; H04N 21/812; H04N 21/25891; H04N 21/2668; H04N 21/44222; H04N 21/23424; H04N 21/25883; H04N 21/4331; H04N 21/8456; H04N 21/2402; H04N 21/25866; H04N 21/4532; H04N 21/47202; H04N 21/6125; H04N 21/64322; H04N 21/2385; H04N 21/2387; H04N 21/2404; H04N 21/43615; H04N 21/44209; H04N 21/44227; H04N 21/4425; H04N 21/4667; H04N 21/6131; H04N 21/6373; H04N 21/6473; H04N 21/64738; H04N 7/17318; H04N 21/23418; H04N 21/251; H04N 21/252; H04N 21/2547; H04N 21/4316; H04N 21/4334; H04N 21/44008; H04N 21/44213; H04N 21/45455; H04N 19/115; H04N 19/30; H04N 19/46; H04N 19/70; H04N 19/80; H04N 19/86; H04N 21/21815; H04N 21/2187; H04N 21/231; H04N 21/23109; H04N 21/233; H04N 21/234318; H04N 21/23439; H04N 21/235; H04N 21/23614; H04N 21/2543; H04N 21/258; H04N 21/26258; H04N 21/266; H04N 21/4126; H04N 21/41407; H04N 21/4383; H04N 21/44016; H04N 21/44204; H04N 21/482; H04N 21/4828; H04N 21/6143; H04N 21/6193; H04N 21/6582; H04N 5/44543
   See application file for complete search history.

(56) References Cited

U.S. PATENT DOCUMENTS

| | | | | |
|---|---|---|---|---|
| 7,362,919 B2* | 4/2008 | Das | ................ | G06F 16/54 382/284 |
| 7,844,086 B2* | 11/2010 | Hu | ................ | G06K 9/6211 382/118 |
| 7,979,877 B2* | 7/2011 | Huber | ................ | G06Q 40/04 725/36 |
| 8,156,014 B2* | 4/2012 | Nakade | ................ | H04L 67/02 705/27.2 |
| 8,219,438 B1* | 7/2012 | Moon | ................ | G06Q 30/0201 705/7.29 |
| 8,267,783 B2* | 9/2012 | van Datta | ................ | G06Q 30/0277 463/33 |
| 8,416,247 B2* | 4/2013 | Zalewski | ................ | G06T 19/003 345/474 |
| 8,522,273 B2* | 8/2013 | Huber | ................ | G06Q 30/02 725/34 |
| 8,549,554 B2* | 10/2013 | Zalewski | ................ | H04N 21/44016 725/32 |
| 8,566,865 B2* | 10/2013 | Zalewski | ................ | H04N 21/478 725/34 |
| 8,578,407 B1* | 11/2013 | Redol | ................ | G06Q 30/0241 725/32 |
| 8,626,584 B2* | 1/2014 | van Datta | ................ | A63F 13/71 705/14.4 |
| 8,645,359 B2* | 2/2014 | Heimendinger | ................ | G06F 16/434 707/722 |
| 8,752,085 B1* | 6/2014 | Brueck | ................ | H04N 21/4305 725/32 |
| 8,752,087 B2* | 6/2014 | Begeja | ................ | G06Q 30/02 725/34 |
| 8,763,090 B2* | 6/2014 | Capati | ................ | H04L 67/22 726/4 |
| 8,855,423 B2* | 10/2014 | Boncyk | ................ | G06K 9/0063 382/181 |
| 8,904,033 B2 | 12/2014 | Kekki et al. | | |

(56) References Cited

U.S. PATENT DOCUMENTS

| | | | | |
|---|---|---|---|---|
| 8,917,911 B2* | 12/2014 | Xiong | | G06K 9/6256 382/108 |
| 8,988,609 B2* | 3/2015 | Zalewski | | H04N 5/147 348/588 |
| 8,989,455 B2* | 3/2015 | Shor | | G06K 9/00201 382/118 |
| 9,038,100 B2* | 5/2015 | Zalewski | | H04N 21/478 725/34 |
| 9,111,287 B2* | 8/2015 | Liu | | G06Q 30/02 |
| 9,183,575 B2* | 11/2015 | Soupliotis | | G06Q 30/0246 |
| 9,250,707 B2* | 2/2016 | Choi | | G06F 3/017 |
| 9,384,242 B1* | 7/2016 | Varadarajan | | G10L 25/54 |
| 9,390,315 B1* | 7/2016 | Yalniz | | G06K 9/4609 |
| 9,530,047 B1* | 12/2016 | Tang | | G06K 9/4652 |
| 9,626,798 B2* | 4/2017 | Zavesky | | H04N 21/21805 |
| 9,646,340 B2* | 5/2017 | Kapur | | G06F 3/017 |
| 9,710,697 B2* | 7/2017 | Tang | | G06K 9/00228 |
| 9,798,959 B2* | 10/2017 | Tang | | G06K 9/00234 |
| 9,811,718 B2* | 11/2017 | Sun | | G06K 9/4628 |
| 9,824,692 B1* | 11/2017 | Khoury | | G10L 17/08 |
| 9,852,523 B2* | 12/2017 | Jamriška | | G06T 11/001 |
| 9,865,017 B2* | 1/2018 | Huber | | G06Q 30/08 |
| 9,870,638 B2* | 1/2018 | Jamriška | | G06T 11/001 |
| 9,872,081 B2* | 1/2018 | Syed | | H04N 21/234345 |
| 9,873,052 B2* | 1/2018 | Van Datta | | G06Q 30/0246 |
| 9,883,249 B2* | 1/2018 | Taylor | | H04N 21/252 |
| 9,913,002 B2* | 3/2018 | An | | H04N 21/44008 |
| 10,009,664 B2* | 6/2018 | Treder | | H04N 21/8586 |
| 10,032,192 B2* | 7/2018 | Tinsman | | H04N 21/237 |
| 10,037,457 B2* | 7/2018 | Tang | | G06K 9/00281 |
| 10,045,091 B1* | 8/2018 | Nijim | | H04N 21/25883 |
| 10,078,909 B1* | 9/2018 | Chen | | G06N 20/00 |
| 10,096,169 B1* | 10/2018 | Chenillo | | G06N 20/00 |
| 10,121,513 B2* | 11/2018 | Martinez | | G06K 9/00744 |
| 10,169,684 B1* | 1/2019 | Nathan | | G06K 9/6276 |
| 10,176,430 B2* | 1/2019 | Shankar | | G06N 7/005 |
| 10,187,689 B2* | 1/2019 | Nguyen | | H04N 21/4331 |
| 10,210,629 B2* | 2/2019 | Ohba | | G06F 3/0346 |
| 10,210,860 B1* | 2/2019 | Ward | | G10L 15/22 |
| 10,248,971 B2* | 4/2019 | Varley | | G06Q 30/0275 |
| 10,282,720 B1* | 5/2019 | Buibas | | G06K 9/00201 |
| 10,289,897 B2* | 5/2019 | Tang | | G06K 9/6215 |
| 10,327,026 B1* | 6/2019 | Mishra | | H04N 21/812 |
| 10,331,942 B2* | 6/2019 | Wong | | G06K 9/00275 |
| 10,346,878 B1* | 7/2019 | Ostermann | | G06Q 30/02 |
| 10,356,478 B2* | 7/2019 | Bonovich | | H04N 21/812 |
| 10,373,322 B1* | 8/2019 | Buibas | | G06K 9/00201 |
| 10,386,637 B2* | 8/2019 | Yoshida | | G09G 3/001 |
| 10,387,920 B2* | 8/2019 | Tinsman | | G06Q 30/0275 |
| 10,387,949 B2* | 8/2019 | Huber | | G06Q 30/0269 |
| 10,412,456 B2* | 9/2019 | Zalewski | | A63F 13/12 |
| 10,417,799 B2* | 9/2019 | Tran | | G06F 16/48 |
| 10,503,970 B1* | 12/2019 | Zhang | | A61B 5/117 |
| 10,546,318 B2* | 1/2020 | Garcia | | G06T 7/70 |
| 10,575,067 B2* | 2/2020 | Ravindran | | H04N 21/812 |
| 10,579,876 B2* | 3/2020 | Tang | | G06N 9/00677 |
| 10,580,179 B2* | 3/2020 | Luan | | G06N 3/0454 |
| 10,671,853 B2* | 6/2020 | Harris | | G06K 9/6257 |
| 10,740,613 B1* | 8/2020 | Sinclair | | G06T 7/246 |
| 10,776,970 B2* | 9/2020 | Luan | | H04N 21/4666 |
| 10,839,416 B1* | 11/2020 | Desmond | | G06Q 30/0643 |
| 2003/0028873 A1* | 2/2003 | Lemmons | | H04N 7/17318 725/36 |
| 2003/0133599 A1* | 7/2003 | Tian | | G06K 9/00308 382/118 |
| 2004/0194128 A1* | 9/2004 | McIntyre | | H04L 1/0015 725/32 |
| 2005/0015370 A1* | 1/2005 | Stavely | | G06F 16/951 |
| 2005/0162442 A1* | 7/2005 | Baba | | G06T 7/73 345/612 |
| 2005/0188402 A1* | 8/2005 | de Andrade | | H04N 5/44543 725/46 |
| 2005/0207648 A1* | 9/2005 | Iguchi | | G06K 9/00281 382/190 |
| 2005/0213810 A1* | 9/2005 | Sabe | | G06K 9/6282 382/159 |
| 2005/0278636 A1* | 12/2005 | Nomoto | | G06T 1/00 715/724 |
| 2007/0079331 A1* | 4/2007 | Datta | | A63F 13/12 725/42 |
| 2007/0122036 A1* | 5/2007 | Kaneda | | G06K 9/00315 382/190 |
| 2007/0130004 A1* | 6/2007 | Borgs | | G06Q 30/02 705/14.48 |
| 2007/0183665 A1* | 8/2007 | Yuasa | | G06K 9/00214 382/195 |
| 2007/0188613 A1* | 8/2007 | Nobori | | H04N 1/3871 348/207.1 |
| 2007/0201729 A1* | 8/2007 | Yuasa | | G06K 9/6211 382/118 |
| 2007/0214476 A1* | 9/2007 | Zalewski | | G09G 5/377 725/32 |
| 2007/0253598 A1* | 11/2007 | Yuasa | | G06K 9/00255 382/104 |
| 2007/0260987 A1* | 11/2007 | Mohoney | | G11B 27/11 715/723 |
| 2007/0299794 A1* | 12/2007 | El-Damhougy | | H04W 40/246 706/15 |
| 2007/0299946 A1* | 12/2007 | El-Damhougy | | H04L 43/0811 709/223 |
| 2008/0016016 A1* | 1/2008 | Mitarai | | G06K 9/6232 706/25 |
| 2008/0033801 A1* | 2/2008 | McKenna | | H04N 21/25891 705/14.4 |
| 2008/0046920 A1* | 2/2008 | Bill | | H04N 21/222 725/34 |
| 2008/0089588 A1* | 4/2008 | Nagahashi | | G06K 9/6256 382/190 |
| 2008/0109305 A1* | 5/2008 | Hengel | | G06Q 10/04 705/14.41 |
| 2008/0109845 A1* | 5/2008 | Hengel | | G06Q 30/02 725/36 |
| 2008/0141181 A1* | 6/2008 | Ishigaki | | G06F 3/011 715/863 |
| 2008/0168489 A1* | 7/2008 | Schraga | | H04N 21/2668 725/32 |
| 2008/0187224 A1* | 8/2008 | Wang | | G06T 11/60 382/190 |
| 2008/0192990 A1* | 8/2008 | Kozakaya | | G06K 9/00221 382/117 |
| 2008/0201144 A1* | 8/2008 | Song | | G10L 15/08 704/236 |
| 2008/0226175 A1* | 9/2008 | Suzuki | | G06K 9/00597 382/190 |
| 2008/0240615 A1* | 10/2008 | Yamazaki | | G06T 11/60 382/287 |
| 2008/0279469 A1* | 11/2008 | Yamazaki | | G06T 11/60 382/254 |
| 2009/0006208 A1* | 1/2009 | Grewal | | G06Q 30/02 705/14.61 |
| 2009/0013347 A1* | 1/2009 | Ahanger | | H04N 21/23424 725/36 |
| 2009/0027337 A1* | 1/2009 | Hildreth | | G06F 3/011 345/158 |
| 2009/0079813 A1* | 3/2009 | Hildreth | | H04N 7/147 348/14.03 |
| 2009/0083147 A1* | 3/2009 | Paila | | G06Q 30/0273 705/14.69 |
| 2009/0091571 A1* | 4/2009 | Zalewski | | G06Q 30/0264 345/427 |
| 2009/0094637 A1* | 4/2009 | Lemmons | | H04N 21/4312 725/32 |
| 2009/0094638 A1* | 4/2009 | Brier | | G06F 16/9535 725/34 |
| 2009/0119172 A1* | 5/2009 | Soloff | | G06Q 30/02 705/344 |
| 2009/0132371 A1* | 5/2009 | Strietzel | | G06T 15/00 705/14.46 |
| 2009/0157472 A1* | 6/2009 | Burazin | | G06Q 30/02 705/14.57 |

(56) References Cited

U.S. PATENT DOCUMENTS

| | | | |
|---|---|---|---|
| 2009/0175540 A1* | 7/2009 | Dariush | G06K 9/00362 382/195 |
| 2009/0262187 A1* | 10/2009 | Asada | G06F 3/017 348/77 |
| 2009/0276805 A1* | 11/2009 | Andrews, II | G06Q 30/02 725/35 |
| 2010/0142446 A1* | 6/2010 | Schlicht | H04W 4/20 370/328 |
| 2010/0154007 A1* | 6/2010 | Touboul | G06Q 30/02 725/60 |
| 2010/0272365 A1* | 10/2010 | Yamamoto | H04H 60/37 382/190 |
| 2010/0312596 A1* | 12/2010 | Saffari | G06F 3/0481 705/7.32 |
| 2010/0312608 A1* | 12/2010 | Shan | G06Q 30/0255 705/14.54 |
| 2011/0043443 A1* | 2/2011 | Kawano | A63F 13/06 345/156 |
| 2011/0044501 A1* | 2/2011 | Tu | G06F 3/017 382/103 |
| 2011/0078623 A1* | 3/2011 | Liu | G06Q 30/02 715/791 |
| 2011/0081089 A1* | 4/2011 | Mori | G06K 9/00281 382/218 |
| 2011/0091071 A1* | 4/2011 | Sabe | G06K 9/00288 382/103 |
| 2011/0123118 A1* | 5/2011 | Nayar | G06T 11/60 382/190 |
| 2011/0135165 A1* | 6/2011 | Wechsler | G06K 9/6228 382/118 |
| 2011/0135205 A1* | 6/2011 | Rhee | G06T 7/60 382/195 |
| 2011/0141258 A1* | 6/2011 | Song | G06K 9/00281 348/77 |
| 2011/0263946 A1* | 10/2011 | el Kaliouby | G06K 9/00335 600/300 |
| 2011/0280441 A1* | 11/2011 | Chen | G06F 3/017 382/103 |
| 2011/0321084 A1* | 12/2011 | Takahashi | H04N 5/2723 725/32 |
| 2012/0027292 A1* | 2/2012 | Kozakaya | G06K 9/00899 382/154 |
| 2012/0095825 A1* | 4/2012 | Mei | G06Q 30/0276 705/14.43 |
| 2012/0113223 A1* | 5/2012 | Hilliges | G06F 3/00 348/46 |
| 2012/0162409 A1* | 6/2012 | Setiawan | G06F 3/011 348/135 |
| 2012/0236180 A1* | 9/2012 | Lin | G06F 3/011 348/239 |
| 2012/0272268 A1* | 10/2012 | McCarthy, III | G06Q 30/0621 725/39 |
| 2012/0306907 A1* | 12/2012 | Huston | H04W 4/021 345/619 |
| 2012/0308141 A1* | 12/2012 | Okubo | G06K 9/6298 382/192 |
| 2013/0019261 A1* | 1/2013 | Huber | G06Q 30/08 725/32 |
| 2013/0022277 A1* | 1/2013 | Morishita | G06T 7/73 382/201 |
| 2013/0024211 A1* | 1/2013 | Monteforte | G06Q 30/0268 705/3 |
| 2013/0039599 A1* | 2/2013 | Aoki | G06T 3/0093 382/276 |
| 2013/0070973 A1* | 3/2013 | Saito | G06K 9/00228 382/118 |
| 2013/0136416 A1* | 5/2013 | Sathish | H04N 21/47202 386/239 |
| 2013/0163854 A1* | 6/2013 | Cheng | H04N 13/261 382/154 |
| 2013/0169827 A1* | 7/2013 | Santos | H04N 5/23229 348/207.1 |
| 2013/0216206 A1* | 8/2013 | Dubin | H04N 7/155 386/282 |
| 2013/0243278 A1* | 9/2013 | Saito | G06K 9/6247 382/128 |
| 2013/0251337 A1* | 9/2013 | Abecassis | H04N 21/47815 386/239 |
| 2013/0265226 A1* | 10/2013 | Park | G06F 3/017 345/156 |
| 2013/0278493 A1* | 10/2013 | Wei | G06K 9/00355 345/156 |
| 2013/0283213 A1* | 10/2013 | Guendelman | G06F 3/017 715/848 |
| 2013/0298159 A1* | 11/2013 | You | H04N 21/478 725/34 |
| 2013/0339857 A1* | 12/2013 | Garcia Bailo | H04N 21/8583 715/723 |
| 2013/0340000 A1* | 12/2013 | Chen | H04N 21/23424 725/35 |
| 2014/0046777 A1* | 2/2014 | Markey | G06Q 30/0269 705/14.66 |
| 2014/0067525 A1* | 3/2014 | Soupliotis | G06Q 30/0273 705/14.45 |
| 2014/0068664 A1* | 3/2014 | Bourne | H04N 21/23412 725/35 |
| 2014/0074586 A1* | 3/2014 | Rangarajan | G06Q 30/0275 705/14.41 |
| 2014/0101578 A1* | 4/2014 | Kwak | G06F 1/1647 715/761 |
| 2014/0112580 A1* | 4/2014 | Hanita | G06T 1/00 382/165 |
| 2014/0121927 A1* | 5/2014 | Hanita | B60T 7/14 701/70 |
| 2014/0147019 A1* | 5/2014 | Hanita | G06K 9/00604 382/117 |
| 2014/0165093 A1* | 6/2014 | Redol | H04N 21/4318 725/32 |
| 2014/0196085 A1* | 7/2014 | Dunker | H04N 21/23424 725/36 |
| 2014/0201770 A1* | 7/2014 | Schraga | G11B 27/036 725/14 |
| 2014/0282722 A1* | 9/2014 | Kummer | H04N 5/76 725/35 |
| 2015/0035825 A1* | 2/2015 | Zhou | G06T 13/40 345/419 |
| 2015/0086121 A1* | 3/2015 | Morishita | G06K 9/00248 382/201 |
| 2015/0100427 A1* | 4/2015 | Chand | G06Q 30/0269 705/14.64 |
| 2015/0128162 A1* | 5/2015 | Ionescu | H04N 21/44209 725/14 |
| 2015/0205997 A1* | 7/2015 | Ma | G06K 9/00261 382/118 |
| 2015/0235277 A1* | 8/2015 | Bagley | G06Q 30/0275 705/14.71 |
| 2015/0254501 A1* | 9/2015 | Yamanashi | G06K 9/00268 348/78 |
| 2015/0262362 A1* | 9/2015 | Zaytsev | G06K 9/00382 382/103 |
| 2015/0262403 A1* | 9/2015 | Yamanashi | G06T 7/73 345/634 |
| 2015/0304698 A1* | 10/2015 | Redol | G11B 27/10 725/23 |
| 2015/0325029 A1* | 11/2015 | Li | G06T 7/20 382/103 |
| 2015/0356346 A1* | 12/2015 | Morishita | G06K 9/00248 382/201 |
| 2015/0363698 A1* | 12/2015 | Kritt | G06Q 30/0255 706/11 |
| 2016/0004904 A1* | 1/2016 | Senechal | G06K 9/00228 382/118 |
| 2016/0005106 A1* | 1/2016 | Giraldez | A61B 34/10 705/14.73 |
| 2016/0005299 A1* | 1/2016 | Zomet | G06F 19/3456 340/573.1 |
| 2016/0012594 A1* | 1/2016 | Romanik | G06T 7/337 382/203 |

(56) References Cited

U.S. PATENT DOCUMENTS

| | | | |
|---|---|---|---|
| 2016/0012595 A1* | 1/2016 | Romanik | G06K 9/6211 382/203 |
| 2016/0027050 A1* | 1/2016 | Chong | G06Q 30/0255 705/14.53 |
| 2016/0042224 A1* | 2/2016 | Liu | G06K 9/00248 382/203 |
| 2016/0078488 A1* | 3/2016 | Simo | G06Q 30/0269 705/14.66 |
| 2016/0112761 A1* | 4/2016 | Venkataraman | H04N 21/4668 725/14 |
| 2016/0140436 A1* | 5/2016 | Yin | G06N 3/08 706/20 |
| 2016/0142792 A1* | 5/2016 | Lee | H04N 21/23418 725/32 |
| 2016/0171340 A1* | 6/2016 | Fleishman | G06K 9/00355 382/159 |
| 2016/0189027 A1* | 6/2016 | Graves | G06N 3/063 706/17 |
| 2016/0189413 A1* | 6/2016 | Houjou | G06K 9/00281 382/118 |
| 2016/0196584 A1* | 7/2016 | Franklin | G06Q 30/0267 705/14.64 |
| 2016/0212455 A1* | 7/2016 | Manna | H04N 21/23424 |
| 2016/0225053 A1* | 8/2016 | Romley | G06T 7/11 |
| 2016/0267637 A1* | 9/2016 | Hsiao | G06F 16/24578 |
| 2016/0294762 A1* | 10/2016 | Miller | G06F 16/24578 |
| 2016/0307072 A1* | 10/2016 | Zhou | G06T 7/0004 |
| 2016/0328096 A1* | 11/2016 | Tran | G06F 16/48 |
| 2016/0328384 A1* | 11/2016 | Divakaran | G06F 16/9535 |
| 2016/0328868 A1* | 11/2016 | Tran | G06T 11/60 |
| 2016/0328875 A1* | 11/2016 | Fang | G06K 9/00355 |
| 2016/0342859 A1* | 11/2016 | Rajaram | G06K 9/6202 |
| 2016/0358321 A1* | 12/2016 | Xu | G06T 7/0002 |
| 2016/0364419 A1* | 12/2016 | Stanton | G06N 3/08 |
| 2016/0371534 A1* | 12/2016 | Koul | G06K 9/00 |
| 2016/0371537 A1* | 12/2016 | He | G06K 9/00228 |
| 2016/0378193 A1* | 12/2016 | Camacho Perez | G06F 3/017 345/156 |
| 2017/0004355 A1* | 1/2017 | Fan | H04N 13/254 |
| 2017/0004399 A1* | 1/2017 | Kasahara | G06N 3/0454 |
| 2017/0006328 A1* | 1/2017 | Verticchio | H04N 21/4147 |
| 2017/0010797 A1* | 1/2017 | Lee | G06F 21/32 |
| 2017/0011280 A1* | 1/2017 | Soldevila | G06K 9/00362 |
| 2017/0032424 A1* | 2/2017 | Cetintas | G06Q 30/0269 |
| 2017/0032553 A1* | 2/2017 | O'Donovan | G06N 7/005 |
| 2017/0068889 A1* | 3/2017 | Fougner | G06N 3/063 |
| 2017/0069077 A1* | 3/2017 | Zhang | G06K 9/4671 |
| 2017/0083086 A1* | 3/2017 | Mazur | G06F 3/0484 |
| 2017/0083524 A1* | 3/2017 | Huang | G06F 16/40 |
| 2017/0094324 A1* | 3/2017 | Wang | H04N 21/812 |
| 2017/0132659 A1* | 5/2017 | Dirks | G06Q 30/0247 |
| 2017/0140210 A1* | 5/2017 | Sun | G06K 9/4671 |
| 2017/0161772 A1* | 6/2017 | Xu | G06F 16/2455 |
| 2017/0164029 A1* | 6/2017 | Dey | H04N 21/2668 |
| 2017/0193548 A1* | 7/2017 | Pacella | G06Q 30/0267 |
| 2017/0221371 A1* | 8/2017 | Yang | G09B 5/06 |
| 2017/0255817 A1* | 9/2017 | Tomimori | G06F 3/013 |
| 2017/0270674 A1* | 9/2017 | Shrivastava | G06K 9/6256 |
| 2017/0272835 A1* | 9/2017 | Osanai | H04N 21/2407 |
| 2017/0278289 A1* | 9/2017 | Marino | G06T 7/44 |
| 2017/0294000 A1* | 10/2017 | Shen | G06T 11/001 |
| 2017/0300741 A1* | 10/2017 | Seuss | G06K 9/00315 |
| 2017/0308753 A1* | 10/2017 | Wu | G06T 7/62 |
| 2017/0309051 A1* | 10/2017 | Yamasaki | G06T 19/00 |
| 2017/0316312 A1* | 11/2017 | Goyal | G06N 3/08 |
| 2017/0323201 A1* | 11/2017 | Sutskever | G06N 3/0445 |
| 2017/0323319 A1* | 11/2017 | Rattner | G06N 20/00 |
| 2017/0323374 A1* | 11/2017 | Park | G06F 3/147 |
| 2017/0330225 A1* | 11/2017 | Krosky | G06Q 30/0251 |
| 2017/0345183 A1* | 11/2017 | Chen | G06T 7/55 |
| 2017/0357720 A1* | 12/2017 | Torabi | G06K 9/00718 |
| 2017/0372130 A1* | 12/2017 | Aas | G06K 9/6256 |
| 2018/0012253 A1* | 1/2018 | Gavlovski | G06Q 30/0276 |
| 2018/0012386 A1* | 1/2018 | Kemelmaher | G06T 11/60 |
| 2018/0013977 A1* | 1/2018 | Martineau | G06K 9/00744 |
| 2018/0018704 A1* | 1/2018 | Tunnell | G06Q 30/0269 |
| 2018/0020247 A1* | 1/2018 | Zhang | G06Q 30/02 |
| 2018/0027307 A1* | 1/2018 | Ni | G06K 9/00315 345/419 |
| 2018/0033173 A1* | 2/2018 | Choi | G06T 11/60 |
| 2018/0041536 A1* | 2/2018 | Berlin | G06N 3/04 |
| 2018/0053228 A1* | 2/2018 | Aaltonen | G06Q 30/0242 |
| 2018/0061456 A1* | 3/2018 | Martinez | G11B 27/34 |
| 2018/0084310 A1* | 3/2018 | Katz | G06F 16/7837 |
| 2018/0114110 A1* | 4/2018 | Han | G06N 3/04 |
| 2018/0122098 A1* | 5/2018 | Wang | G06T 7/75 |
| 2018/0122114 A1* | 5/2018 | Luan | G06T 7/73 |
| 2018/0137338 A1* | 5/2018 | Kraus | G06K 9/6259 |
| 2018/0137360 A1* | 5/2018 | Hussein | G06K 9/00751 |
| 2018/0137642 A1* | 5/2018 | Malisiewicz | G06T 7/11 |
| 2018/0143756 A1* | 5/2018 | Mildrew | G06F 3/011 |
| 2018/0144193 A1* | 5/2018 | Tang | G06K 9/00677 |
| 2018/0146024 A1* | 5/2018 | Wang | H04L 65/607 |
| 2018/0157892 A1* | 6/2018 | Han | G06K 9/0061 |
| 2018/0160158 A1* | 6/2018 | Liu | G06Q 30/02 |
| 2018/0165548 A1* | 6/2018 | Wang | G06N 3/084 |
| 2018/0177461 A1* | 6/2018 | Bell | A61B 5/7267 |
| 2018/0181864 A1* | 6/2018 | Mathew | G06N 3/0454 |
| 2018/0191962 A1* | 7/2018 | Javier | G06F 16/44 |
| 2018/0192160 A1* | 7/2018 | Ravindran | H04N 21/812 |
| 2018/0197575 A1* | 7/2018 | Doherty | G06Q 30/0241 |
| 2018/0220061 A1* | 8/2018 | Wang | G06K 9/00664 |
| 2018/0225842 A1* | 8/2018 | Wang | G06K 9/00248 |
| 2018/0240257 A1* | 8/2018 | Li | G06T 11/60 |
| 2018/0253869 A1* | 9/2018 | Yumer | G06T 11/001 |
| 2018/0276528 A1* | 9/2018 | Lin | G06K 9/6215 |
| 2018/0300589 A1* | 10/2018 | Levinshtein | G06K 9/6262 |
| 2018/0308114 A1* | 10/2018 | Deng | G06Q 30/0203 |
| 2018/0308523 A1* | 10/2018 | Silvestri | G11B 27/34 |
| 2018/0341829 A1* | 11/2018 | Kigawa | G06K 9/00624 |
| 2018/0341872 A1* | 11/2018 | Wang | G06N 3/0454 |
| 2018/0343481 A1* | 11/2018 | Loheide | H04N 21/2393 |
| 2018/0349682 A1* | 12/2018 | Wong | G06K 9/00906 |
| 2018/0357819 A1* | 12/2018 | Oprea | G06T 17/00 |
| 2018/0359516 A1* | 12/2018 | Gorinshteyn | H04N 21/4725 |
| 2018/0374138 A1* | 12/2018 | Mohamed | G06Q 30/0631 |
| 2018/0374209 A1* | 12/2018 | Patil | G06T 7/0012 |
| 2019/0005149 A1* | 1/2019 | Wang | G06F 17/30958 |
| 2019/0005619 A1* | 1/2019 | Michelini | G06T 3/40 |
| 2019/0012528 A1* | 1/2019 | Wilson | H04N 13/25 |
| 2019/0012548 A1* | 1/2019 | Levi | G06K 9/00791 |
| 2019/0014320 A1* | 1/2019 | Navarrete Michelini | H04N 19/63 |
| 2019/0017911 A1* | 1/2019 | Kiranyaz | G01N 3/02 |
| 2019/0019055 A1* | 1/2019 | Zhou | G06K 9/34 |
| 2019/0025773 A1* | 1/2019 | Yang | G05B 13/0265 |
| 2019/0026897 A1* | 1/2019 | Wu | G06T 7/11 |
| 2019/0026917 A1* | 1/2019 | Liao | G06T 7/73 |
| 2019/0034704 A1* | 1/2019 | Qiu | G06N 3/084 |
| 2019/0034709 A1* | 1/2019 | Qiu | G06N 3/0454 |
| 2019/0034714 A1* | 1/2019 | Barth | G06K 9/3233 |
| 2019/0035113 A1* | 1/2019 | Salvi | G06N 3/08 |
| 2019/0035126 A1* | 1/2019 | Shen | A45D 44/00 |
| 2019/0041984 A1* | 2/2019 | Lee | G06K 9/4652 |
| 2019/0057509 A1* | 2/2019 | Lv | G06T 7/254 |
| 2019/0059561 A1* | 2/2019 | Shen | A45D 44/00 |
| 2019/0065873 A1* | 2/2019 | Wang | G06K 9/00355 |
| 2019/0065895 A1* | 2/2019 | Wang | G06K 9/00771 |
| 2019/0073589 A1* | 3/2019 | Beser | G06N 3/04 |
| 2019/0080148 A1* | 3/2019 | He | G06N 20/00 |
| 2019/0080154 A1* | 3/2019 | Xu | G06K 9/6274 |
| 2019/0082972 A1* | 3/2019 | Tao | A61B 5/1102 |
| 2019/0087648 A1* | 3/2019 | Du | G06K 9/00288 |
| 2019/0087686 A1* | 3/2019 | Du | G06K 9/00248 |
| 2019/0087712 A1* | 3/2019 | Sundaresan | G06N 3/0454 |
| 2019/0087889 A1* | 3/2019 | Rice | G06Q 30/0643 |
| 2019/0095780 A1* | 3/2019 | Zhong | G06N 3/082 |
| 2019/0098149 A1* | 3/2019 | Shinoda | G06K 9/00281 |
| 2019/0102607 A1* | 4/2019 | Aas | G06K 9/00268 |
| 2019/0104827 A1* | 4/2019 | Nishi | G16H 20/70 |
| 2019/0107894 A1* | 4/2019 | Hebbalaguppe | G06F 3/011 |
| 2019/0122045 A1* | 4/2019 | Ravi | G06K 9/00228 |
| 2019/0122082 A1* | 4/2019 | Cuban | G09G 3/20 |

(56) References Cited

U.S. PATENT DOCUMENTS

| | | | |
|---|---|---|---|
| 2019/0122404 A1* | 4/2019 | Freeman | G06T 7/251 |
| 2019/0130580 A1* | 5/2019 | Chen | G06K 9/2054 |
| 2019/0138268 A1* | 5/2019 | Andersen | G06F 16/90332 |
| 2019/0138791 A1* | 5/2019 | Wang | G06K 9/6256 |
| 2019/0147221 A1* | 5/2019 | Grabner | G06K 9/00214 |
| 2019/0147304 A1* | 5/2019 | Liu | G06K 9/6828 |
| 2019/0159737 A1* | 5/2019 | Buckler | A61B 5/7267 |
| 2019/0164341 A1* | 5/2019 | Venkataraman | G06T 7/149 |
| 2019/0171707 A1* | 6/2019 | Rapaport | G06F 17/2705 |
| 2019/0171868 A1* | 6/2019 | Taigman | G06T 3/0093 |
| 2019/0171936 A1* | 6/2019 | Karras | G06N 3/08 |
| 2019/0172039 A1* | 6/2019 | Kambara | G06Q 20/201 |
| 2019/0179405 A1* | 6/2019 | Sun | G06Q 30/0643 |
| 2019/0182306 A9* | 6/2019 | Wang | H04N 21/438 |
| 2019/0191203 A1* | 6/2019 | Asbun | H04N 21/2668 |
| 2019/0205630 A1* | 7/2019 | Kusens | G06K 9/00369 |
| 2019/0205694 A1* | 7/2019 | Wang | G06K 9/00268 |
| 2019/0206101 A1* | 7/2019 | De la Torre | G06K 9/00228 |
| 2019/0215482 A1* | 7/2019 | Sathya | G06T 5/50 |
| 2019/0220698 A1* | 7/2019 | Pradeep | G06K 9/6293 |
| 2019/0222798 A1* | 7/2019 | Honma | G10L 19/008 |
| 2019/0244408 A1* | 8/2019 | Nishi | A45D 44/005 |
| 2019/0259136 A1* | 8/2019 | Shpalensky | G06T 7/70 |
| 2019/0266387 A1* | 8/2019 | Sun | G06K 9/62 |
| 2019/0279045 A1* | 9/2019 | Li | G06K 9/3241 |
| 2019/0279347 A1* | 9/2019 | Hayasaka | G06T 5/50 |
| 2019/0279393 A1* | 9/2019 | Ciuc | G06K 9/00268 |
| 2019/0281187 A1* | 9/2019 | Sakashita | H04N 1/442 |
| 2019/0291008 A1* | 9/2019 | Cox | G06N 3/0454 |
| 2019/0294860 A1* | 9/2019 | Jin | G06K 9/00281 |
| 2019/0294863 A9* | 9/2019 | Qiu | G06N 3/02 |
| 2019/0294866 A9* | 9/2019 | Qiu | G06K 9/00208 |
| 2019/0294868 A1* | 9/2019 | Martinez | G06K 9/00275 |
| 2019/0304152 A1* | 10/2019 | Sa-Garriga | G06K 9/622 |
| 2019/0306463 A1* | 10/2019 | Zuckerman | G06K 9/6267 |
| 2019/0318194 A1* | 10/2019 | Liu | G06T 7/12 |
| 2019/0325200 A1* | 10/2019 | Qian | G06N 3/08 |
| 2019/0329790 A1* | 10/2019 | Nandakumar | B60W 50/08 |
| 2019/0354746 A1* | 11/2019 | Zhang | G06K 9/00268 |
| 2019/0378333 A1* | 12/2019 | Castaneda | G06T 19/006 |
| 2020/0001124 A1* | 1/2020 | Gugino | A62B 27/00 |
| 2020/0019686 A1* | 1/2020 | Min | G06F 21/32 |
| 2020/0019699 A1* | 1/2020 | Araujo | G06F 21/57 |
| 2020/0034979 A1* | 1/2020 | Hayduke | G06T 11/60 |
| 2020/0036528 A1* | 1/2020 | Ortiz | G06N 3/08 |
| 2020/0042549 A1* | 2/2020 | Mizrahi | G06F 12/1054 |
| 2020/0042769 A1* | 2/2020 | Yan | G06K 9/00248 |
| 2020/0042781 A1* | 2/2020 | Zuckerman | G06F 16/587 |
| 2020/0043213 A1* | 2/2020 | Bao | G06T 11/001 |
| 2020/0066046 A1* | 2/2020 | Stahl | G06F 3/011 |
| 2020/0074205 A1* | 3/2020 | Yi | G06K 9/6273 |
| 2020/0076990 A1* | 3/2020 | Zhu | G06K 9/00228 |
| 2020/0086483 A1* | 3/2020 | Li | B25J 9/163 |
| 2020/0104642 A1* | 4/2020 | Wei | G06K 9/6257 |
| 2020/0105013 A1* | 4/2020 | Chen | G06T 7/75 |
| 2020/0111241 A1* | 4/2020 | Luan | G11B 27/036 |
| 2020/0118258 A1* | 4/2020 | Ohashi | G02B 27/017 |
| 2020/0118269 A1* | 4/2020 | Alsan | A61B 5/7267 |
| 2020/0134778 A1* | 4/2020 | He | G06T 11/001 |
| 2020/0134859 A1* | 4/2020 | Li | G06K 9/6271 |
| 2020/0134868 A1* | 4/2020 | Liu | G06K 9/00302 |
| 2020/0143146 A1* | 5/2020 | Li | G06K 9/6232 |
| 2020/0143563 A1* | 5/2020 | Liu | G06K 9/00805 |
| 2020/0151432 A1* | 5/2020 | Zhu | G06K 9/628 |
| 2020/0167893 A1* | 5/2020 | Gupta | G06K 9/4628 |
| 2020/0184198 A1* | 6/2020 | Takahashi | G06T 7/74 |
| 2020/0193591 A1* | 6/2020 | Kamiyama | G06T 7/75 |
| 2020/0210764 A1* | 7/2020 | Hamedi | G06N 3/084 |
| 2020/0218883 A1* | 7/2020 | Wang | G06K 9/6257 |
| 2020/0218916 A1* | 7/2020 | Wu | G06K 9/00335 |
| 2020/0234690 A1* | 7/2020 | Savchenkov | G10L 13/08 |
| 2020/0279120 A1* | 9/2020 | Bao | G06K 9/00214 |
| 2020/0327690 A1* | 10/2020 | Cai | G06K 9/00369 |
| 2021/0001885 A1* | 1/2021 | Zhang | G06T 7/70 |
| 2021/0004618 A1* | 1/2021 | Qin | G06K 9/00604 |
| 2021/0004619 A1* | 1/2021 | Qin | G06K 9/00845 |
| 2021/0009150 A1* | 1/2021 | Chen | G06K 9/00845 |
| 2021/0012091 A1* | 1/2021 | Liu | G06K 9/00255 |
| 2021/0012136 A1* | 1/2021 | Zhang | G06K 9/3233 |
| 2021/0012143 A1* | 1/2021 | Bao | G06N 3/08 |
| 2021/0012523 A1* | 1/2021 | Zhou | G06F 17/16 |
| 2021/0039521 A1* | 2/2021 | Hu | G06K 9/00369 |
| 2021/0082181 A1* | 3/2021 | Shi | G06N 3/04 |
| 2021/0103744 A1* | 4/2021 | Gao | G06K 9/6211 |
| 2021/0118149 A1* | 4/2021 | Sollami | G06T 7/11 |

* cited by examiner

METHOD AND APPARATUS FOR DISPLAYING BUSINESS OBJECT IN VIDEO IMAGE AND ELECTRONIC DEVICE

CROSS-REFERENCE TO RELATED APPLICATION

This application is a continuation of PCT/CN2017/098027 filed on Aug. 18, 2017, which claims the priorities from Chinese Application No. CN201610694812.X, filed on Aug. 19, 2016, entitled "Method and Apparatus for Displaying Business Object in Video Image, and Terminal Device," and Chinese Application No. CN201610694625.1 filed on Aug. 19, 2016, entitled "Method and Apparatus for Processing Video Image, and Terminal Device," the entire contents of which are hereby incorporated by reference.

TECHNICAL FIELD

The present disclosure relates to the field of artificial intelligence technology, and more specifically to a method and apparatus for displaying a business object in a video image and an electronic device.

BACKGROUND

With the development of the Internet technology, more and more people use the internet to view videos, Internet videos provide commercial opportunities to many new businesses. The internet video has become an important business entry point, and is considered an excellent resource for product placement.

In the existing video advertisement, mainly through an embedding mode, an advertisement with a fixed time length is inserted before the video is broadcasted or at a certain time during the video broadcasting, or an advertisement is placed at a fixed position in a broadcasting and surrounding area of the video.

SUMMARY

Embodiments of the present disclosure provide a technical solution of displaying a business object in a video image.

According to one aspect of the embodiments of the present disclosure, a method for displaying a business object in a video image is provided, which includes: detecting at least one target object from a video image, and determining a feature point of the at least one target object; determining a display position of a to-be-displayed business object in the video image according to the feature point of the at least one target object; and drawing the business object at the display position by using computer graphics.

According to another aspect of the embodiments of the present disclosure, an apparatus for displaying a business object in a video image is provided, which includes: a first determining module, configured to detect at least one target object from a video image, and determine a feature point of the at least one target object; a second determining module, configured to determine a display position of a to-be-displayed business object in the video image according to the feature point of the at least one target object; and a drawing module, configured to draw the business object at the display position by using computer graphics.

According to still another aspect of the embodiments of the present disclosure, an electronic device is also provided, which includes a processor, a memory, a communication interface and a communication bus, wherein the processor, the memory and the communication interface communicate with each other via the communication bus, and the memory is used to store an executable instruction, the executable instruction causing the processor to perform an operation corresponding to the method for displaying a business object in a video image according to any embodiment of the present disclosure.

According to still another aspect of the embodiments of the present disclosure, another electronic device is also provided, which includes a processor and the apparatus for displaying a business object in a video image according to any embodiment of the present disclosure, wherein when the processor runs the apparatus for displaying a business object in a video image, a unit in the apparatus for displaying a business object in a video image according to any embodiment of the present disclosure is run.

According to still another aspect of the embodiments of the present disclosure, a computer program product is also provided, which includes a computer readable code, when the computer readable code is run on a device, a processor in the device executes an instruction for implementing each step in the method for displaying a business object in a video image according to any embodiment of the present disclosure.

According to still another aspect of the embodiments of the present disclosure, a computer readable storage medium is also provided, which is used to store a computer readable instruction, wherein when the instruction is executed, an operation of each step in the method for displaying a business object in a video image according to any embodiment of the present disclosure is implemented.

According to the technical solution provided by the embodiments of the present disclosure, the target object is detected from the video image and the feature point of the target object is determined, different target objects possess different feature points, the determined feature point of the target object is served as a basis for determining the display position of the to-be-displayed business object to determine the display position of the to-be-displayed business object, and the business object is drawn at the determined display position by using computer graphics, so as to display the business object. For instance, in a video image with a human face and a simple background, the human face may be served as the target object, the human face as the target object is acquired by detecting this video image and its feature point (for example, which may include, but not limited to, feature points corresponding to some or all of an eyebrow, an eye, a mouth, a nose and a face contour) is determined, and the display position of the to-be-displayed business object is determined with reference to these feature points, for example, the business object is displayed at a forehead part above the eyebrows. In the embodiments of the present disclosure, when the business object is a to-be-displayed advertisement, on the one hand, the business object is drawn at the determined display position by using computer graphics, without transmitting extra advertisement video data irrelevant to a video through a network, which is conductive to saving network resources and system resources of a client; on the other hand, the business object combines closely with the target object in the video image, so that the business object may be displayed in a mode not disturbing an audience, a normal video viewing experience of the audience would not be affected and an antipathy of the audience is difficult to be aroused, and thus, an expected effect may be effectively achieved.

Hereinafter, the technical solution of the present disclosure will be further described in detail through accompanying drawings and the embodiments.

BRIEF DESCRIPTION OF THE DRAWINGS

The accompanying drawings forming a part of the Specification describe embodiments of the present disclosure, together with principles explaining the present disclosure.

Referring to the accompanying drawings, the present disclosure can be understood more clearly according to the following detailed description.

DETAILED DESCRIPTION OF EMBODIMENTS

Figure 1:
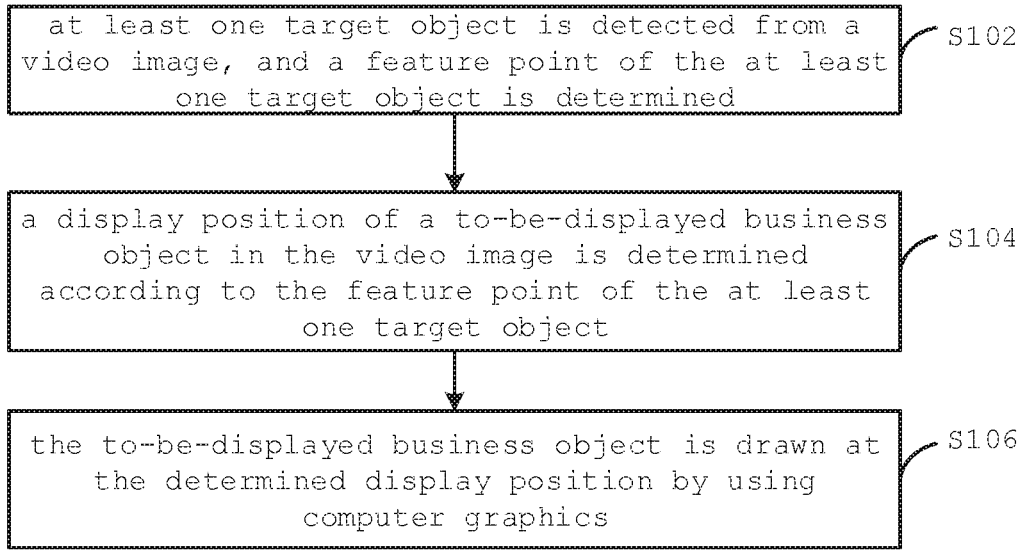
FIG. 1 is a flowchart of an embodiment according to a method for displaying a business object in a video image of the present disclosure.

Various exemplary embodiments of the present application will now be described in detail with reference to the drawings. It should be noted that, unless otherwise specified, relative arrangements of parts and procedures, expressions of figures and numerical values described in these embodiments do not limit the scope of the present application.

Meanwhile, it should be understood that, in order to facilitate description, the sizes of all parts shown in the drawings are not drawn according to an actual proportional relation.

The description hereinafter of at least one exemplary embodiment is actually only illustrative, and severs by no means as any limitation to the present application and an application or usage thereof.

Technologies, methods and devices known by those of ordinary skills in related arts may not be discussed in detail, but in appropriate situations, the technologies, methods and devices should be regarded as part of the specification.

It should be noted that similar reference numbers and letters in the following drawings represent similar terms, so that once a certain term is defined in a drawing, there is no need of further discussing this term in the follow-up drawings.

Those skilled in the art may appreciate that "first", "second" and other terms in the embodiments of the present application are only used to distinguish different steps, devices or modules etc., representing neither any specific technical meanings, nor an inevitable logic sequence of them.

The embodiments of the present application may be applied to electronic devices, such as a terminal device, a computer system, a server etc., which can be operated together with many other multipurpose or special-purpose computing system environments or configurations. Examples of well-known terminal devices, computing systems, environments and/or configurations suitable for use together with the electronic devices, such as the terminal device, the computer system, a server etc., include but not limited to a personal computer system, a server computer system, a thin client, a thick client, a handhold or laptop device, a microprocessor-based system, a set-top box, a programmable consumable electronic product, a network personal computer, a small-scale computer system, a large-scale computer system, a distributed cloud computing technical environment including any system described above, etc.

The electronic devices, such as the terminal device, the computer system, the server etc. may be described under an ordinary context of a computer system executable instruction (such as a program module) executed by the computer system. Usually, the program module may include a routine, a program, a target program, a component, a logic, a data structure etc., which execute specified tasks or realize specified abstract data types. The computer system/server may be implemented in a distributed cloud computing environment in which a task is executed by a remote processing device linked though a communication network. In the distributed cloud computing environment, the program module may be positioned on a local or remote computing system storage medium including a storage device.

Specific implementations of the embodiments of the present disclosure will be further described below in detail in combination with the accompanying drawings (the same symbol in some accompanying drawings indicates the same element) and the embodiments. The following embodiments are used for describing the present disclosure, rather than limiting the scope of the present disclosure.

FIG. 1 is a flowchart of an embodiment according to a method for displaying a business object in a video image of the present disclosure. Referring to FIG. 1, the method for displaying a business object in a video image in this embodiment includes the following steps.

In step S102, at least one target object is detected from a video image, and a feature point of the at least one target object is determined.

In various embodiments of the present disclosure, the video image is an image corresponding to a video data frame in a video, for example, which may be an image in a video that is live-streaming (i.e., a live streaming video image), and may also be an image in a video that is broadcasted after being recorded. Each video image may include a certain target object, such as a person, a gesture, and a background.

In various embodiments of the present disclosure, the target object is an object existing in the video image and easily to be viewed by an audience, which may include, but not limited to, a human body (e.g., a human face and a body part), a movement (e.g., a posture and a gesture), a background and so on. The target object generally possesses a certain number of feature points, such as conventional 68 feature points of the human face including an eye, a nose, a mouth and a face contour, feature points of a hand including a fingertip, a knuckle and a hand contour, and feature points of a background border. The embodiments of the present disclosure will not limit the target object and the feature point of the target object, which may be adapted to any target object and any feature point of the target object.

In an alternative example of this operation, a corresponding feature extraction algorithm or a neural network model (e.g., a convolutional network model) may be used to detect the target object from the video image and determine the feature point of the target object, and a basis may be provided for a subsequent determining of a display position of a to-be-displayed business object by detecting the target object in the video image and determining the feature point of the target object. For instance, after the feature points of the background border are determined, the business object may be displayed at an appropriate position in the background, or after the feature points of the human face are determined, the business object may be displayed at an appropriate position in the human face (such as a forehead and a cheek).

In an alternative example, step S102 may be performed by a processor invoking a corresponding instruction stored in a memory, and may also be performed by a first determining module 702 run by the processor.

In step S104, a display position of a to-be-displayed business object in the video image is determined according to the feature point of the at least one target object.

In various embodiments of the present disclosure, the business object, for example, may include but not limited to: special effect containing semantic information (e.g., information such as information on advertisement, entertainment, weather forecast, traffic forecast and pet), wherein the special effect, for example, may be a three-dimensional (3D) effect, for example, a three-dimensional advertisement effect such as an advertisement that is presented in a 3D effect, or a two-dimensional (2D) sticker, for example, a two-dimensional advertisement sticker effect such as an advertisement that is presented in a form of sticker, or a particle effect. Not limited by the above, other forms of business objects are also applicable to the technical solution of the embodiment of the present disclosure, such as an application (APP) or textual description or presentation of the application, a certain object that interacts with a video viewer (such as an electronic pet).

A mode of determining the display position of the to-be-displayed business object in the video image in accordance with the feature point of the target object will be described below in detail. As an example, the display position may be determined by a set rule, according to the feature point of the target object. As another example, the display position may be determined by using a trained neural network model (e.g., the convolutional network model) according to the feature point of the target object.

After the feature point of the target object is determined, one or a plurality of display positions of the to-be-displayed business object in the video image may be determined based on the feature point of the target object, where the term "a plurality of" refers to a number that is equal to or greater than two.

In an alternative example, step S104 may be performed by the processor invoking a corresponding instruction stored in the memory, and may also be performed by a second determining module 704 run by the processor.

In step S106, the to-be-displayed business object is drawn at the determined display position by using computer graphics.

After the display position is determined, the business object may be drawn at the display position by using computer graphics, so as to display the business object. When the business object is a sticker containing semantic information, the sticker may be used to put and display an advertisement. For instance, a name of one product is displayed via a sticker of a virtual cap type to attract attention of an audience, thereby enhancing interesting of putting and displaying of the advertisement and improving putting and displaying efficiency of the advertisement. When the business object is a sticker, for example, an advertisement sticker, related information of the business object (such as an identifier and a size of the business object) may be first acquired when the business object is drawn by using computer graphics. After the display position is determined, the business object may be adjusted (e.g., the business object may be zoomed and rotated) according to a coordinate of an area in which the display position in located (e.g., a rectangular area of the display position), and then the business object is drawn in a corresponding drawing mode. In some cases, an advertisement may also be displayed with a 3D special effect, for example, a word or a trademark (LOGO) in the advertisement is displayed in the form of a particle special effect.

In an alternative example of various embodiments of the present disclosure, the business object may be drawn using computer graphics, which may be implemented by a proper computer image drawing or rendering mode, for example, including but not limited to, drawing based on an OpenGL graphics drawing engine. OpenGL defines a professional graphics program interface with a cross-programming-language and cross-platform programming interface specification, and the interface is hardware-independent and may be used to easily draw a 2D or 3D graphic image. OpenGL not only may be used to draw a 2D effect such as a 2D sticker, but may also be used to draw a 3D effect and a particle effect and the like. However, the present disclosure is not limited to the drawing mode based on the OpenGL graphics drawing engine, and other mode may also be adopted, for example, a drawing mode based on a graphics drawing engine such as Unity, OpenCL or the like is also adapted to the various embodiments of the present disclosure.

In an alternative example, step S106 may be performed by the processor invoking a corresponding instruction stored in the memory, and may also be performed by a drawing module 706 run by the processor.

According to the method for displaying a business object in a video image provided by this embodiment, the target object is detected from the video image and the feature point of the target object is determined, different target objects possess different feature points, the determined feature point is served as a basis for determining the display position of the to-be-displayed business object to determine the display position of the to-be-displayed business object, and the business object is drawn at the determined display position by using computer graphics, so as to display the business object. When the business object is a to-be-displayed advertisement, on one hand, the business object is drawn at the determined display position by using computer graphics and is combined with video broadcasting, without transmitting extra advertisement video data irrelevant to a video through a network, which is conductive to saving network resources and system resources of a client; on the other hand, the business object combines closely with the target object in the video image, so that the business object may be displayed in a mode not disturbing an audience, a normal video viewing experience of the audience would not be affected and antipathy of the audience is difficult to be aroused, which is conductive to improving the putting efficiency and effect of the business object and achieving the expected display efficiency and effect.

In an alternative example of above various embodiments of the present disclosure, the business object may include a plurality of associated business objects. Accordingly, in the various embodiments, the determining a display position of a to-be-displayed business object in the video image may include determining corresponding display positions of a plurality of to-be-displayed associated business objects in the video image. The drawing the business object at the display position by using computer graphics may include drawing the plurality of associated business objects at the plurality of determined corresponding display positions respectively by using computer graphics.

In an alternative example of various embodiments of the present disclosure, the plurality of associated business objects may include for example, but not limited to, one or more of: a special effect containing semantic information that are used for displaying a same business object theme, multiple display portions of a same special effect containing semantic information, and a special effect containing semantic information that are provided by a same business object provider. As one example, the special effect may be any one of a two-dimensional sticker special effect containing advertisement information, a three-dimensional special effect containing advertisement information and a particle special effect containing advertisement information. In addition, other forms of the business object are also adapted to video image processing solutions provided by the embodiment of the present disclosure, for instance, a cheek sticker special effect, a forehead sticker special effect and a background sticker special effect provided by the Coca-Cola Company, and for another instance, a virtual headwear sticker special effect and a virtual clothing sticker special effect of a game theme and a background sticker special effect associated with a game scene.

In an alternative example of various embodiments of the present disclosure, the plurality of corresponding display positions include any one or more of: a hair area, a forehead area, a cheek area, a chin area and a body area except a head of a person in the video image, a background area in the video image, an area within a set range in the video image that is centered in an area where a hand is located, and a preset area in the video image. Therefore, the plurality of to-be-displayed associated business objects may be displayed at a same display position, and may also be displayed at different display positions.

By taking the two-dimensional sticker special effect as an example, when the plurality of associated business objects are multiple two-dimensional sticker special effects containing advertisement information that are used for displaying a same business object theme, or multiple display portions of a same two-dimensional sticker special effect containing advertisement information, or multiple two-dimensional sticker special effects containing advertisement information that are provided by a same business object provider, the putting and displaying of an advertisement may be performed by using the multiple two-dimensional sticker special effects or the multiple display portions of the same two-dimensional sticker special effect. For instance, in the live streaming video, the name of a given product is displayed at the mouth position of an anchorman via the virtual cap type sticker special effect, and at the same time, the product is displayed at a hand position of the anchorman via the virtual container type sticker special effect, and the product and its name are displayed in the background of the live streaming video via the background type sticker special effect, thereby significantly attracting attention of an audience, enhancing interesting of the putting and displaying of the advertisement, and improving putting and displaying efficiency of the advertisement.

Figure 2:
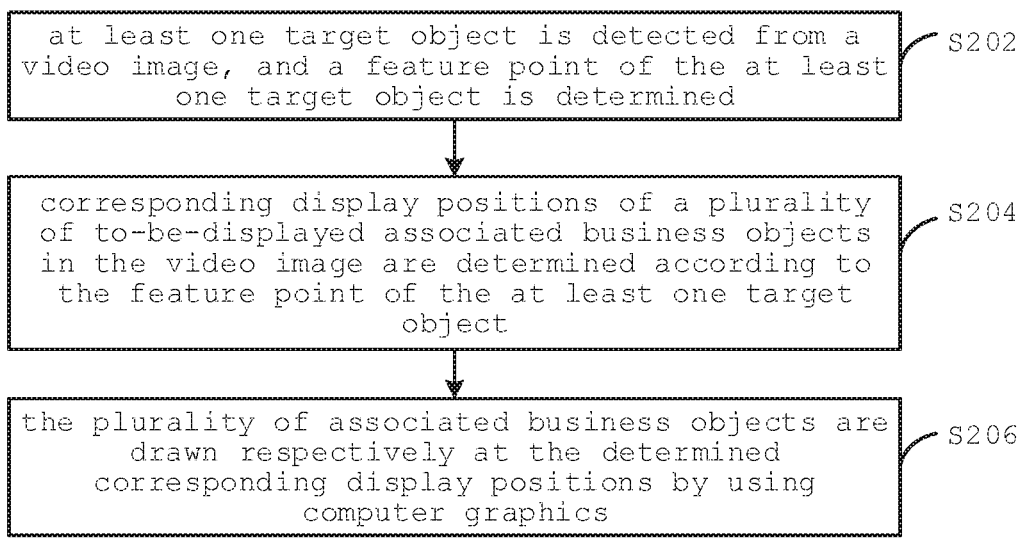
FIG. 2 is a flowchart of another embodiment according to the method for displaying a business object in a video image of the present disclosure.

FIG. 2 is a flowchart of another embodiment according to the method for displaying a business object in a video image of the present disclosure. As shown in FIG. 2, the method for displaying a business object in a video image of this embodiment includes the following steps.

In step S202, at least one target object is detected from a video image, and a feature point of the at least one target object is determined.

The video image may be an image corresponding to a video data frame in a video, and each image includes a certain target object, such as a person, a gesture, a background or the like. By taking the video image being a live streaming video image as an example, a live streaming video is mostly composed of an anchorman and background behind the anchorman (such as home of the anchorman or other video recording places). One target object like a human face or a plurality of target objects such as a human face, a background, a movement and the like may be acquired by detecting the live streaming video image.

In various embodiments of the present disclosure, any appropriate mode in related techniques may be adopted to implement the detecting the target object in the video image and the determining the feature point of the target object. As an example, a linear feature extraction mode such as Principal Component Analysis (PCA), linear discriminant analysis (LDA), independent component analysis (ICA) and the like, may be adopted. As another example, a non-linear feature extraction mode, such as kernel principal component analysis (Kernel PCA), manifold learning and the like, may be adopted. A trained neural network model (e.g., the convolutional network model in the embodiment of the present disclosure) may be used to extract the feature point of the target object. The embodiments of the present disclosure will not limit the specific mode.

As an example, in a process of video broadcasting by a live streaming application, the target object is detected from the live-streaming video image and the feature point of the target object is determined. As another example, in a process of broadcasting one recorded video, an electronic device detects the target object from a broadcasting video image and determines the feature point of the target object. As still another example, in a process of recording a video, the electronic device detects the target object from a recording video image and determines the feature point of the target object.

In an alternative example, step S202 may be performed by a processor invoking a corresponding instruction stored in a memory, and may also be performed by a first determining module 702 run by the processor.

In step S204, corresponding display positions of a plurality of to-be-displayed associated business objects in the video image are determined according to the feature point of the at least one target object.

In an alternative example, step S204 may be performed by the processor invoking a corresponding instruction stored in the memory, and may also be performed by a second determining module 704 run by the processor.

In step S206, the plurality of associated business objects are drawn respectively at the determined corresponding display positions by using computer graphics.

After a plurality of display positions are determined, the plurality of associated business objects may be drawn at the corresponding display positions by using computer graphics, so as to display the associated business objects. When the associated business objects are stickers (e.g., advertisement stickers), related information of the associated business objects (such as identifiers and sizes of the associated business objects) may be first acquired when the business object is drawn by using computer graphics. After the display positions are determined, the associated business objects may be adjusted (e.g., the associated business objects may be zoomed and rotated) according to coordinates of areas in which the display positions (e.g., rectangular areas of the display positions) are located, and then the associated business objects are drawn in a corresponding drawing mode (e.g., OpenGL graphics drawing engine).

For instance, it is assumed that the detected target object in the present embodiment is a human face and the background, and three determined display positions are a mouth in the human face, a hand and the background, multiple special effects containing advertisement information of one business object provider (e.g., the Coca-Cola Company) may be drawn at the display position of the mouth, a sticker special effect of a virtual container (e.g., a beverage bottle of the Coca-Cola) may be drawn at the display position of the hand for example, and a sticker special effect with a poster of the Coca-Cola Company as the background for example may be drawn at the display position of the background.

In an alternative example, step S206 may be performed by the processor invoking a corresponding instruction stored in the memory, and may also be performed by a drawing module 706 run by the processor.

With the rising of the Internet Live Streaming, more and more videos are presented in a live streaming mode. These kinds of videos have features of simple scenario, real-time and a relatively small size of the video image due to its watching by an audience is primarily on an electrical device (such as a cellphone and the like). In this case, for the putting of some business objects such as the putting of the advertisement, in an aspect, since a display area of a screen of the electronic device is finite, if the advertisement is placed at a traditional fixed position, a main user experience area may be occupied, and thus, not only antipathy of an user may be easily aroused, but also audiences of a live-streaming anchorman may be reduced; and in another aspect, for a live streaming application with an anchorman, due to immediacy of the live streaming, traditional inserting an advertisement with a fixed time duration may disturb the coherence of communication between a user and the anchorman, thereby affecting watching experience of the user; in still another aspect, for a short video advertisement, since a duration of the live streaming video contents or a duration of the short video contents is relatively short, it also bring difficulties to insert the advertisement with the fixed time duration in the traditional mode. However, in the embodiment of the present application, the advertisement is put via the business object, and the advertisement putting combines effectively with contents of the live streaming video, which is flexible to implement and has a vivid effect, is conductive to improving live stream watching experience of the user, and also conductive to enhancing a putting effect of the advertisement, and is suitable for a scenario such as advertisement putting or displaying the business object with a relatively small display screen. It can be understood that, besides the advertisement, the putting of the business object may also be widely applied to other aspects such as an education industry, a consulting industry, a service industry and the like, and an interacting effect and a user experience may be improved by putting business information such as entertainment and admiration.

According to the method for displaying a business object in a video image provided by the present embodiment, the at least one target object is detected from the video image and the feature point of the at least one target object is determined, different target objects possess different feature points; the determined feature point of the at least one target object is served as a basis for determining the display position of the to-be-displayed business object, so as to determine the display positions of the plurality of to-be-displayed associated business objects; and the associated business objects are respectively drawn at the plurality of determined display positions by using computer graphics, so as to display the business object. When the associated business objects are to-be-displayed advertisements, on one hand, the associated business objects combine closely with the target object in the video image, so that the associated business objects may be displayed from multiple angles without affecting the normal video watching of the audience, thereby attracting the attention of the audience, thereby enhancing influence of the business object; and on the other hand, the associated business objects are drawn at the determined display positions by using computer graphics and are combined with the video broadcasting, so there is no need to transmit extra advertisement video data irrelevant to a video through a network, which is conductive to saving network resources and system resources of a client.

In addition, before the various embodiments as illustrated in FIG. 1 or FIG. 2 of the present disclosure, the method may further include an operation of acquiring the video image. For instance, an image in a video that is currently broadcasting (i.e., the live streaming video image) is acquired from the live streaming application, or a video image is acquired from a video that is recording. The embodiments of the present disclosure will not limit the approach for acquiring the video image.

In various embodiments of the present disclosure, processing on one video image is taken as an example. However, it should be understood by those skilled in the art that video image processing on multiple video images or a video image sequence in a video stream may be performed with reference to the embodiments of the present disclosure. In an alternative example of the various embodiments of the present disclosure, when the display position of the to-be-displayed business object or the display positions of the associated business objects in the video image are determined according to the feature point of the at least one target object, a possible implementation, for example, may include the following approaches.

In approach 1, the display position of the to-be-displayed business object and the display positions of the plurality of to-be-displayed associated business objects in the video image are determined according to the feature point of the at least one target object by using a convolutional network model. The convolutional network model is pre-trained and used to determine a display position of a business object in the video image.

In approach 2, a type of the target object is determined according to the feature point of the at least one target object; a display area of the to-be-displayed business object is determined according to the type of the at least one target object; and the display position of the to-be-displayed business object in the video image is determined according to the display area. If the business object includes the plurality of associated business object, the approach 2 accordingly includes: determining corresponding display areas of the plurality of associated business objects according to the type of the at least one target object; and determining the corresponding display positions of the plurality of associated business objects in the video image according to the corresponding display areas of the plurality of associated business objects.

In approach 3, the display position of the to-be-displayed business object in the video image is determined according to the feature point of the at least one target object and the type of the to-be-displayed business object. If the business object includes the plurality of associated business objects, the approach 3 accordingly includes: determining the display positions of the plurality of associated business objects in the video image according to the feature point of the at least one target object and types of the plurality of to-be-displayed associated business objects.

In approach 4, a target display position corresponding to the feature point of the target object is acquired from a pre-stored corresponding relationship between feature points of target objects and display positions, and the acquired target display position is determined as the display position of the to-be-displayed business object in the video image. If the business object includes the plurality of associated business objects, the approach 4 accordingly includes: acquiring a target display position corresponding to the feature point of the target object from a pre-stored corresponding relationship between the feature points of the target objects and the display positions, and determining a plurality of acquired target display positions as the corresponding display positions of the plurality of associated business objects in the video image.

Hereinafter, the four approaches will be respectively described with examples.

Approach 1

When the display position of the to-be-displayed business object in the video image is determined with approach 1, one convolutional network model is pre-trained, and the trained convolutional network model possesses a function of determining a display position of a business object or display positions of a plurality of associated business objects in a video image; or a convolutional network model that is trained by a third party and possesses a function of determining a display position of a business object or display positions of a plurality of associated business objects in a video image may be directly used.

It should be noted that, in the present embodiment, the description is made with training of the business object as an example, and training of the target object part may be implemented with reference to related techniques, which is briefly described in the embodiment of the present disclosure.

When the convolutional network model is trained, a possible training approach may include the following processes.

(1), a feature vector of a business object sample image to be trained is acquired by using the convolutional network model.

Here, the feature vector contains information of a target user in the business object sample image, as well as position information and/or confidence information of the business object. Here, the information of the target user indicates image information of the target user; the position information of the business object indicates a position of the business object, which may be position information of a center point of the business object or position information of the area where the business object is located. The confidence information of the business object indicates a probability that an effect (such as being followed or clicked or watched) may be achieved when the business object is presented at the current position. The probability may be set according to a statistical analysis result of the historical data, a simulation experiment result or artificial experience. In a practical application, while the target object is trained, according to the actual needs, the convolution network model may be trained regarding the position information of the business object only, or the convolution network model may be trained for the confidence information of the business object only, or the convolution network model may be trained for both the position information of the business object and the confidence information of the business object. The training of the convolution network model for both the above enables the trained convolution network model to determine the position information and confidence information of the business object more effectively and accurately, thus providing a basis for the presentation of the business object.

The convolutional network model is trained through a large number of sample images. The business object in the business object sample image in the embodiment of the present disclosure may be pre-marked with the position information, confidence information or both of the position information and the confidence information. Naturally, such information may also be obtained through other means in practical application. By marking the business object with corresponding information in advance, data to be processed and a number of interactions may be effectively saved, and data processing efficiency may be improved.

The business object sample image having information of the target user as well as the position information and/or the confidence information of the business object is used as a training sample, and feature vector extraction is performed on the business object sample image to acquire a feature vector containing the information of the target user as well as the position information and/or the confidence information of the business object.

Here, the extraction of the feature vector may be implemented with a suitable approach in related technologies, which will not be described herein in the embodiment of the present disclosure.

Alternatively, the target object and the business object may be respectively trained with the same convolutional network model. In this case, the feature vector of the business object sample image may respectively include the information of the target object, or include the position information and/or confidence information of the business object.

(2), convolution processing is performed on the feature vector by using the convolutional network model to acquire a convolution result of the feature vector.

The acquired convolution result of the feature vector contains the information of the target object, and the position information and/or confidence information of the business object.

A number of times of the convolution processing performed on the feature vector may be set according to actual requirements. That is, in the convolutional network model, a number of layers in a convolutional layer may be set according to actual requirements, so that a final convolution result of the feature vector may meet a standard that an error is within a certain range. For instance, the final convolution result of the feature vector may be $1/20 \sim 1/5$ of an image length or an image width, and in one example, the final convolution result of the feature vector may be 1/10 of the image length or the image width.

The convolution result is a result of the feature extraction performed on the feature vector, and the convolution result is able to effectively characterize features and classifications of various related objects (e.g., the target object and the business object) in the video image.

In the embodiment of the present disclosure, when the feature vector contains both the position information of the business object and the confidence information of the business object, that is, in the case where the convolution network model is trained for both the position information and the confidence information of the business object, the feature vector convolution result is shared when the convergence conditions are judged separately later without repeated processing and calculation, thus reducing resource consumption caused by the data processing, and improving data processing speed and data processing efficiency.

In an alternative example, operations (1) and (2) may be performed by the processor invoking corresponding instructions stored in the memory, and may also be performed by the convolutional network model run by the processor.

(3), whether corresponding information of the target object and corresponding position information and/or confidence information of the business object in the convolution result of the feature vector meet a convergence condition are determined, respectively.

The convergence condition may be appropriately set by those skilled in the art according to actual requirements. When the above-mentioned information meets the convergence condition, it may be considered that parameters in the convolutional network model are set appropriately. When the above-mentioned information does not meet the convergence condition, it may be considered that a parameter in the convolutional network model is set inappropriately and needs to be adjusted, and the adjustment is an iterative process. That is, operations (1) to (3) in the training approach are iterated until the information in the convolution result of the feature vector meets the convergence condition.

In an alternative approach, the convergence condition may be set according to a preset standard position and/or a preset standard confidence. For example, whether a distance from a position indicated by the position information of the business object in the convolution result of the feature vector to the preset standard position meets a certain threshold is used as the convergence condition for the position information of the business object, and whether a difference between a confidence indicated by the confidence information of the business object in the convolution result of the feature vector and the preset standard confidence meets a certain threshold is used as the convergence condition for the confidence information of the business object.

Alternatively, the preset standard position may be an average position obtained by averaging the positions of the business objects in the business object sample images to be trained, and the preset standard confidence may be an average confidence obtained by averaging the confidences of the business objects in the business object sample images to be trained. The standard position and/or the standard confidence are set according to the positions and/or the confidences of the business objects in the business object sample images to be trained. Since the sample images are samples to be trained and have a large amount of data, the set standard position and standard confidence are more objective and more precise.

For example, when it is determined whether the corresponding position information and/or confidence information of the business object in the convolution result of the feature vector meet the convergence condition, a possible approach includes:

acquiring the corresponding position information of the business object in the convolution result of the feature vector; calculating a first distance between the position indicated by the corresponding position information of the business object and the preset standard position using a first loss function; and determining whether the corresponding position information of the business object meets the convergence condition according to the first distance; and/or acquiring the corresponding confidence information of the business object in the convolution result of the feature vector; calculating a second distance between the confidence indicated by the corresponding confidence information of the business object and the preset standard confidence using a second loss function; and determining whether the corresponding confidence information of the business object meets the convergence condition according to the second distance.

In an alternative implementation, the first loss function may be a function for calculating a Euclidean distance between the position indicated by the position information of the corresponding business object and the preset standard position; and/or the second loss function may be a function for calculating a Euclidean distance between the confidence indicated by the confidence information of the corresponding business object and the preset standard confidence. The approach of the Euclidean distance is simple to be implemented and may effectively indicate whether the convergence condition is met, but it is not limited hereto. Other approaches such as Mahalanobis distance, Bhattacharyya distance or the like are also applicable.

Whether the information of the target user in the convolution result of the feature vector is converged may be determined by referring to relevant convergence condition using the convolution network model, which will not be described herein. If the information of the target user meets the convergence condition, the target user may be classified, and a category to which the target user belongs is specified, thus providing reference and basis for subsequent determination of the display position of the business object.

(4), training of the convolutional network model is completed if the convergence condition is met; and a parameter of the convolutional network model is adjusted according to the convolution result of the feature vector if the convergence condition is not met, and an iterative training of the convolutional network model is performed according to the adjusted parameter of the convolutional network model until the convolution result of the feature vector that is acquired after the iterative training meets the convergence condition.

In an alternative example, operations (3) and (4) may be performed by the processor invoking corresponding instructions stored in the memory, and may also be performed by a training module 708 run by the processor.

After the convolutional network model is trained by the above training approach, the convolutional network model may perform feature extraction and classification on the display position of the business object that is displayed based on the target object, thereby possessing the function of determining the display position of the business object in the video image. When the display position includes a plurality of display positions, the convolutional network model may also determine a preference order of display effects of the plurality of display positions through the above training for the confidence of the business object, and thus, an optimal display position is determined. In the subsequent application, an effective display position may be determined according to a current image in the video when the business object needs to be displayed.

In addition, before the above training of the convolutional network model, pre-processing may also be performed on the business object sample image, which may include: acquiring a plurality of business object sample images, wherein each of the business object sample image contains annotation information of a business object; determining positions of the business objects according to the annotation information and determining whether distances between the determined positions of the business objects and a preset position is less than or equal to a set threshold value; and determining a business object sample image corresponding to a business object with a distance between a determined position and the preset position being less than or equal to the set threshold value, as the business object sample image to be trained to participate in the above training process. The preset position and the set threshold value may be appropriately set by those skilled in the art by using any appropriate approach, such as a result of statistic analysis, or a related distance calculating formula or artificial experience, which will not be limited by the embodiment of the present disclosure.

In a possible approach, the position of the business object that is determined according to the annotation information may be a central position of the business object. When determining the position of the business object according to the annotation information and determining whether a distance between the determined position of the business object and a preset position is less than or equal to a set threshold value, the central position of the business object may be determined according to the annotation information; and whether a variance between the central position and the preset position is less than or equal to a set threshold value is judged.

A sample image that does not meet the condition may be filtered out via the pre-processing on the business object sample image, so as to ensure accuracy of the training result.

Training of the convolutional network model is implemented according to the above process, and the display position of the business object in the video image may be determined by using the trained convolutional network model. For instance, in a live broadcasting process of a video, when an anchorman clicks a business object to instruct to display the business object, after acquiring a facial feature point of the anchorman in the live-streaming video image, the convolutional network model may indicate the optimal position for displaying the business object, such as a forehead of the anchorman, a mouth of the anchorman and a background of the live streaming video, and control the live streaming application to display the business or the associated business objects (e.g., a plurality of stickers belonging to a same object theme and containing semantic information) at the position; or in a live broadcasting process of a video, when an anchorman clicks a business object to instruct to display the business object, the convolutional network model may directly determine the display position of the business object according to the live-streaming video image.

Approach 2

In approach 2, the type of the at least one target object is first determined according to the feature point of the at least one target object; the display area of the to-be-displayed business object is then determined according to the type of the at least one target object; and then, the display position of the to-be-displayed business object in the video image is determined according to the display area.

The type of the target object may include, but not limited to, a human face type, a background type, a hand type and an action type. The human face type indicates that a human face occupies a main portion in the video image, the background type indicates that a background occupies a relatively large portion in the video image, the hand type indicates that a hand occupies a major portion in the video image, and the action type indicates that a person in the video image does some kind of action.

The type of the target object may be determined by using related detection, classification or learning methods, after the feature point of the at least one target object is acquired. The display area of the to-be-displayed business object may be determined by a set rule, after the type of the at least one target object is determined.

For instance, if the type of the target object is the human face type, it is determined that the display area of the to-be-displayed business object includes one or more of a hair area, a forehead area, a cheek area, a chin area or a body area except a head of the person in the video image; and/or if the type of the target object is the background type, it is determined that the display area of the to-be-displayed business object includes a background area in the video image; and/or when the type of the target object is the hand type, it is determined that the display area of the to-be-displayed business object includes an area that is within a set range in the video image and is centered in an area where a hand is located; and/or When the type of the target object is the action type, it is determined that the display area of the to-be-displayed business object includes a preset area in the video image. The preset area may be appropriately set according to actual requirements, such as an area that is centered at an action generation position and within a set range, or an area that is beyond an action generation position and is within a set range, or a background area or the like, which will not be limited by the embodiment of the present disclosure.

That is, when the business object includes the plurality of associated business objects, the plurality of associated business objects may be displayed in a combination manner in the determined display areas of the to-be-displayed business object such as the hair area, the forehead area, the background area and the hand area and the like, i.e., the plurality of associated business objects are displayed at different display positions. In addition, the plurality of associated business objects may be displayed at a same display position (e.g., the hair area). By taking a scenario of a live streaming video with an anchorman as an example, the scenario generally includes a common scenario of a live streaming or a short video sharing, subjects of the scenario are generally a major person (e.g., the anchorman) and a simple background (e.g., a house of the anchorman), wherein a person generally occupies a larger portion of a screen. For instance, when the subject of the video is a person, a primary area concerned by an audience is a face area and body movement of the subject. In order to enable an audience to concern more contents of the advertisement, and meantime, to enable the subject of the video to be not affected, a plurality of virtual items containing semanteme such as a 2D sticker special effect containing advertisement information (i.e., the business object) may be added into some related areas such as the person area and background area in the screen by the augmented reality effect. Commercial value is achieved by display effect and display information of a combination of the plurality of virtual items. By this approach, a major image and the movement of the video subject are kept, and interesting of the video is also increased through the special effect with augmented reality, which is conductive to reducing possible antipathy of an audience aroused by the putting of the advertisement, and attracting attention of the audience, thereby forming a commercial value.

In an alternative implementation, an action corresponding to the action type includes one or more of blinking, mouth opening, nodding, head shaking, kissing, smiling, hand waving, scissors hand, first clenching, palm-up, thumbs-up, a shooting hand, a V hand, and an Ok hand.

After the display area is determined, the display position of the to-be-displayed business object in the video image may be further determined. As an example, a central point of the display area is served as a central point of the display position of the business object for displaying the business object. As another example, a certain coordinate position in the display area is determined as the central point of the display position. The determining of the central point of the display position will not be limited by the embodiments of the present disclosure.

Approach 3

In another alternative implementation, compared with the approach 2, in approach 3, when the display position of the to-be-displayed business object in the video image is determined, the display position of the to-be-displayed business object in the video image may be determined according to the feature point of the target object, and the display position of the to-be-displayed business object in the video image may also be determined according to the type of the to-be-displayed business object. The type of the business object includes one or more of: a forehead sticker type, a cheek sticker type, a chin sticker type, a virtual hat type, a virtual clothing type, a virtual makeup type, a virtual headwear type, a virtual hair accessory type, a virtual jewelry type, a background type, a virtual pet type, or a virtual container type. But not limited hereto, the type of the business object may also be other appropriate types, such as a virtual cap type, a virtual cup type and a text type and the like.

Accordingly, the feature point of the target object may be served as a reference to select an appropriate display position of the business object according to the type of the business object.

In addition, in a situation where a plurality of display positions of the to-be-displayed business object in the video image are obtained according to the feature point of the target object and the type of the to-be-displayed business object, at least one display position may be selected from the plurality of display positions as a final display position. For instance, for a business object of a text type, it may be displayed in the background area and may also be displayed in the forehead area or the body area of a person.

Approach 4

In the approach 4, a target display position corresponding to the feature point of the at least one target object is acquired from a pre-stored corresponding relationship between the feature point of the target object and the display position; and the acquired target display position is determined as the display position of the to-be-displayed business object in the video image. The corresponding relationship between the feature point of the target object and the display position may be preset and stored in a form, such as a mapping table. The storing manner of the corresponding relationship is not be limited by the embodiment of the present disclosure.

Figure 3:
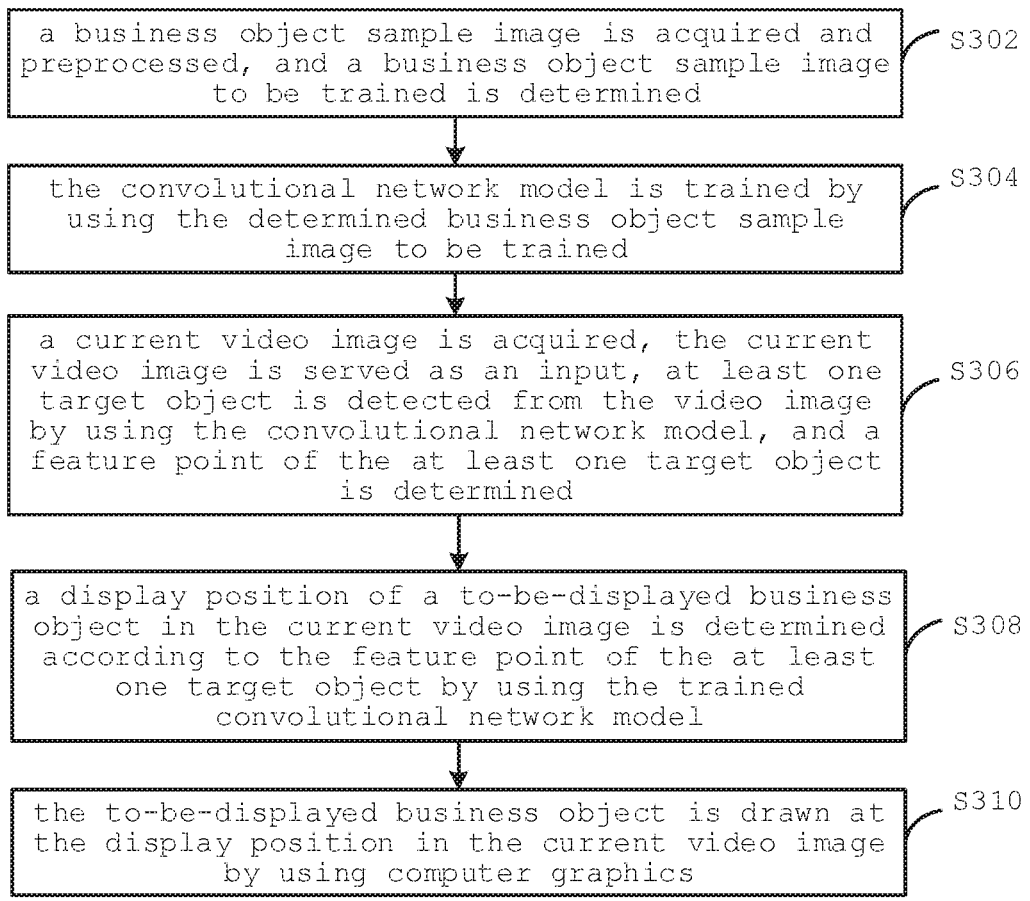
FIG. 3 is a flowchart of still another embodiment according to the method for displaying a business object in a video image of the present disclosure.

FIG. 3 is a flowchart of still another embodiment according to the method for displaying a business object in a video image of the present disclosure. In the present embodiment, the solution of displaying a business object in a video image according to the embodiment of the present disclosure is described by taking a business object being a sticker containing semantic information, and more particularly, being an advertisement sticker, as an example. As shown in FIG. 3, The method for displaying a business object in a video image according to the present embodiment includes the following steps.

In step S302, a business object sample image is acquired and preprocessed, and a business object sample image to be trained is determined.

The business object sample image may include some sample images which do not meet a training standard of a convolutional network model. In the present embodiment, this part of the sample images which do not meet the training standard of the convolutional network model may be filtered out by preprocessing the business object sample image.

In the present embodiment, each of the business object sample images contains an annotated target object and an annotated business object, and the business object is annotated with position information and confidence information. In a possible implementation, position information of a central point of the business object is served as the position information of the business object. In the present step, the sample images are filtered according to the position information of the business objects. After a coordinate of a position indicated by the position information is acquired, the coordinate of the position indicated by the position information is compared with a preset position coordinate of this type of business object to calculate a position variance therebetween. If the position variance is less than or equal to a set threshold value, the business object sample image may be served as the sample image to be trained. If the position variance is greater than the set threshold value, the business object sample image is filtered out. The preset position coordinate and the set threshold value may be appropriately set by those skilled in the art according to actual requirements. For instance, since the sample images for training the convolutional network model generally have a same size, the set threshold value may be set to be $\frac{1}{20}$-$\frac{1}{5}$ of an image length or an image width. For instance, the set threshold value may be $\frac{1}{10}$ of the image length or the image width.

In addition, the determined positions and confidences of the business objects in the business object sample images to be trained may be averaged to acquire an average position and an average confidence. The average position and the average confidence may be served as a basis for subsequent determination of a convergence condition.

When taking the business object being an advertisement sticker as an example, the business object sample image for training in the present embodiment is annotated with coordinates of an optimal advertisement position and a confidence of the advertisement position. The coordinates of the optimal advertisement position may be annotated at a place such as a human face, a gesture, a front background or the like, thereby realizing a combined training for an advertisement position of the place such as a facial feature point, a gesture, foreground-background and the like, which is conductive to saving calculation resources as compared with a separated training solution based on advertisement position and confidence of one of the face, a gesture and the like. A value of the confidence indicates a probability that the advertisement position is the optimal advertisement position. For instance, if a major portion of the advertisement position is blocked, the confidence is low.

In an alternative example, the operation S302 may be performed by a processor invoking a corresponding instruction stored in a memory, and may also be performed by a preprocessing module 7080 run by the processor.

In step S304, the convolutional network model is trained by using the determined business object sample image to be trained.

In an alternative example, the operation S302 may be performed by the processor invoking a corresponding instruction stored in the memory, and may also be performed by a training module 708 run by the processor.

In the present embodiment, a brief description of an alternative structure of the convolutional network model is as follows.

(1) Input Layer

For instance, a feature vector of a business object sample image to be trained may be inputted, and the feature vector includes information of a target object, and also contains information of a business object including position information and confidence information of the business object.

(2) Convolutional Layer

//In a first stage, convolution processing is performed on the feature vector of the business object sample image to be trained to acquire a convolution result of the feature vector and share the convolution result of the feature vector.

2. <=1 convolutional layer 1_1 (3×3×64)
3. <=2 nonlinear response ReLU layer
4. <=3 convolutional layer 1_2 (3×3×64)
5. <=4 nonlinear response ReLU layer
6. <=5 pooling layer (3×3/2)
7. <=6 convolutional layer 2_1 (3×3×128)
8. <=7 nonlinear response ReLU layer
9. <=8 convolutional layer 2_2 (3×3×128)
10. <=9 nonlinear response ReLU layer
11. <=10 pooling layer (3×3/2)
12. <=11 convolutional layer 3_1 (3×3×256)
13. <=12 nonlinear response ReLU layer
14. <=13 convolutional layer 3_2 (3×3×256)
15. <=14 nonlinear response ReLU layer
16. <=15 convolutional layer 3_3 (3×3×256)
17. <=16 nonlinear response ReLU layer
18. <=17 pooling layer (3×3/2)
19. <=18 convolutional layer 4_1 (3×3×512)
20. <=19 nonlinear response ReLU layer
21. <=20 convolutional layer 4_2 (3×3×512)
22. <=21 nonlinear response ReLU layer
23. <=22 convolutional layer 4_3 (3×3×512)
24. <=23 nonlinear response ReLU layer
25. <=24 pooling layer (3×3/2)
26. <=25 convolutional layer 5_1 (3×3×512)
27. <=26 nonlinear response ReLU layer
28. <=27 convolutional layer 5_2 (3×3×512)
29. <=28 nonlinear response ReLU layer
30. <=29 convolutional layer 5_3 (3×3×512)
31. <=30 nonlinear response ReLU layer
32. <=31 pooling layer (3×3/2)

//In a first training branch of a second stage, a regression analysis is performed on the position of the business object (i.e., the advertisement sticker) in the convolution result of the feature vector in the first stage, to predict coordinates of the optimal position of the advertisement sticker.

33. <=32 convolutional layer 6_1 (1×1×2304)
34. <=33 nonlinear response ReLU layer
35. <=34 convolutional layer 6_2 (1×1×2)

36. <=35 loss layer, for performing a regression for the coordinates of the optimal advertisement position //In a second training branch of the second stage, a regression analysis is performed for the confidence of the business object (i.e., the advertisement sticker) in the convolution result of the feature vector in the first stage, to predict a confidence of the advertisement sticker.

37. <=31 pooling layer (3×3/2)
38. <=37 convolutional layer cls_6_1 (1×1×4096)
39. <=38 nonlinear response ReLU layer
40. <=39 convolutional layer cls_6_2 (1×1×4096)
41. <=40 nonlinear response ReLU layer
42. <=41 convolutional layer cls_7_1 (1×1×1)
43. <=42 loss layer, for performing the regression for the confidence (3) Output Layer In the present embodiment, an output of the output layer may be a predicted value of layer 35 (i.e., convolutional layer 6_2 (1×1×2)) and a predicted value of layer 42 (i.e., convolutional layer cls_7_1 (1×1×1)).

The following description should be noted.

Firstly, the first training branch of the second stage and the second training branch of the second stage share the convolution result of the feature vector in the first stage, which is conductive to saving calculation resources.

Secondly, the training of the first training branch in the second stage and the training of the second training branch in the second stage may be performed in no particular order, may be performed in parallel, or may be performed in any chronological order;

Thirdly, in the present embodiment, the convolution result of the feature vector in the first stage may contain feature extraction and classification result of the target object, contain feature extraction and classification result of the business object, and further contain feature extraction and classification results of the position information and confidence information of the business object;

Fourthly, in the first training branch of the second stage, the prediction for the optimal position of the advertisement sticker may be performed through multiple iterations, a network parameter (e.g., a value of a convolutional kernel, and a weight of a batch normalization for an output of a layer) is adjusted according to a predicted result once one prediction for the optimal position of the advertisement sticker is completed, and the prediction is further performed based on the convolutional network model with an adjusted parameter, multiple iterations are performed until the convergence condition is met. Specifically, in the first training branch, loss layer 36 uses a first loss function to determine whether a position of the advertisement sticker trained in the first stage meets the convergence condition. In a situation where the convergence condition is not met, the convolutional network model is propagated backward to adjust a training parameter of the convolutional network model, thereby implementing a regression calculation for the optimal position of the advertisement sticker. In the present embodiment, the first loss function may use a function $\min_{x,y}(x-x_{gt})^2+(y-y_{gt})^2$ that measures a Euclidean distance, wherein (x, y) are coordinates of a to-be-optimized advertisement sticker, and $(x_{gt}, y_{gt})$ are coordinates of a preset standard position. In an alternative implementation, the preset standard position may be an average position that is acquired in step S302 after the positions of the business objects in the business object sample images to be trained are averaged.

The convergence condition may be, for instance, coordinates of a to-be-optimized advertisement sticker being the same as the coordinates of the preset standard position, or a difference between the coordinates of the to-be-optimized advertisement sticker and the coordinates of the preset standard position being less than a certain threshold value (for example, 1/20~1/5 of an image length or an image width, and alternatively may be 1/10), or a number of iteration times for optimizing the parameter achieving a predetermined number of times (e.g., 10-20), or the like.

Fifthly, in the second training branch of the second stage, the prediction of the confidence of the advertisement sticker may be performed through multiple iterations, a network parameter (such as a value of a convolutional kernel, and a weight of a batch normalization for an output of a layer) is adjusted according to a predicted result once one prediction for the confidence of the advertisement sticker is completed, and the prediction is further performed based on a convolutional network model with an adjusted parameter, multiple iterations are performed until the convergence condition is met. For example, in the second training branch, loss layer 43 uses a second loss function to determine whether the confidence of the advertisement sticker trained in the first stage meets the convergence condition. In a situation where the convergence condition is not met, the convolutional network model is propagated backward to adjust a training parameter of the convolutional network model, thereby implementing a regression calculation for the confidence of the advertisement sticker. In the present embodiment, the second loss function may use a function $\min_p (p-p_{gt})^2$ that measures a Euclidean distance for example, wherein p is a confidence of the to-be-optimized advertisement sticker, $p_{gt}$ is a preset standard confidence. In an alternative implementation, the preset standard confidence may be an average confidence that is acquired in step S302 after the confidences of the business objects in the business object sample images to be trained are averaged.

The convergence condition may be, for instance, a to-be-optimized confidence being the same as a preset standard confidence, or a difference between the to-be-optimized confidence and the preset standard confidence being less than a certain threshold value (e.g., less than or equal to 25%), or a number of iteration times for optimizing the parameter achieving a predetermined number of times (e.g., 10-20) or the like.

Sixthly, in the above description of the structure of the convolutional network, 2. <=1 indicates that the current layer is layer 2 and the input layer is layer 1; the bracket after the convolutional layer refers to a parameter of the convolutional layer (3×3×64), which indicate that a size of the convolutional kernel is 3×3, and a number of channels is 64, the bracket (3×3/2) after the pooling layer indicate that a size of a pooling kernel is 3×3 and an interval is 2. Other cases may be similarly deduced and will not be repeatedly described herein.

In the above structure of the convolutional network, there exists a nonlinear response unit after each convolutional layer, and the nonlinear response unit adopts a Rectified Linear Unit (Rectified Linear Units, ReLU). Mapping result of the convolutional layer may be attenuated as much as possible by adding the Rectified Linear Unit after the convolutional layer, so as to be closer to visual response of a person, thereby improving processing effect of the image.

As an example, the convolutional kernel of the convolutional layer is set to 3×3, and thus, local information in the video image may be better synthesized.

A stride of the pooling layer (Max pooling) is set, so that a feature of an upper layer acquires a larger field of vision without increasing calculation burden. The stride of the pooling layer further possesses a feature of increasing spatial invariance, that is, a same input is allowed to appear at different image positions with a same output result response.

However, those skilled in the art should understand that, the size of the convolutional kernel, the channel number, and the size of the pooling kernel, the interval and the layer number of the convolutional layers are all described with examples, which may be adaptively adjusted in a practical application by those skilled in the art according to actual requirements, and will not be limited by the embodiment of the present disclosure. In addition, a combination of all the layers and parameters in the convolutional network model in the present embodiment are alternative and may be used in any combination.

Through the convolutional network model in the present embodiment, the first training branch is used to predict the optimal position of the advertisement sticker, and the second training branch is used to predict the confidence of the position, thereby realizing an effective prediction of the position of the advertisement sticker in the video image.

In step S306, a current video image is acquired, the current video image is served as an input, at least one target object is detected from the video image by using a trained convolutional network model, and a feature point of the at least one target object is determined.

In an alternative example, step S306 may be performed by the processor invoking a corresponding instruction stored in the memory, and may also be performed by a first determining module 702 run by the processor.

In step S308, a display position of a to-be-displayed business object in the current video image is determined according to the feature point of the at least one target object by using the trained convolutional network model.

In an alternative example, step S308 may be performed by the processor invoking a corresponding instruction stored in the memory, and may also be performed by a second determining module 704 run by the processor.

In step S310, the to-be-displayed business object is drawn at the display position in the current video image by using computer graphics.

In an alternative example, step S310 may be performed by the processor invoking a corresponding instruction stored in the memory, and may also be performed by a drawing module 706 run by the processor.

With the development of the live streaming and the short video sharing, more and more videos are presented in a live streaming manner or in a manner of a short video. In these videos, a person is generally served as a main character (a single person or a few people), and the person and a simple background are generally served as a main scene, and an audience mostly watches these videos on a mobile terminal such as a cellphone. Through the technical solution provided in the present embodiment, a video image in a video broadcasting process may be detected in real time to provide an advertisement putting position with a better effect without affecting watching experience of a user, and thus having a better putting effect. Certainly, besides the above scenario, other scenarios such as a video recording scenario and the like are also adapted to the technical solution provided in the present embodiment.

In addition, the method for displaying a business object in a video image according to the embodiment may be implemented at any appropriate terminal device which possesses functions of data acquisition, processing and transmission (e.g., the mobile terminal or a personal computer (PC)), the embodiment of the present disclosure does not set limitation on the implementing device.

Figure 4:
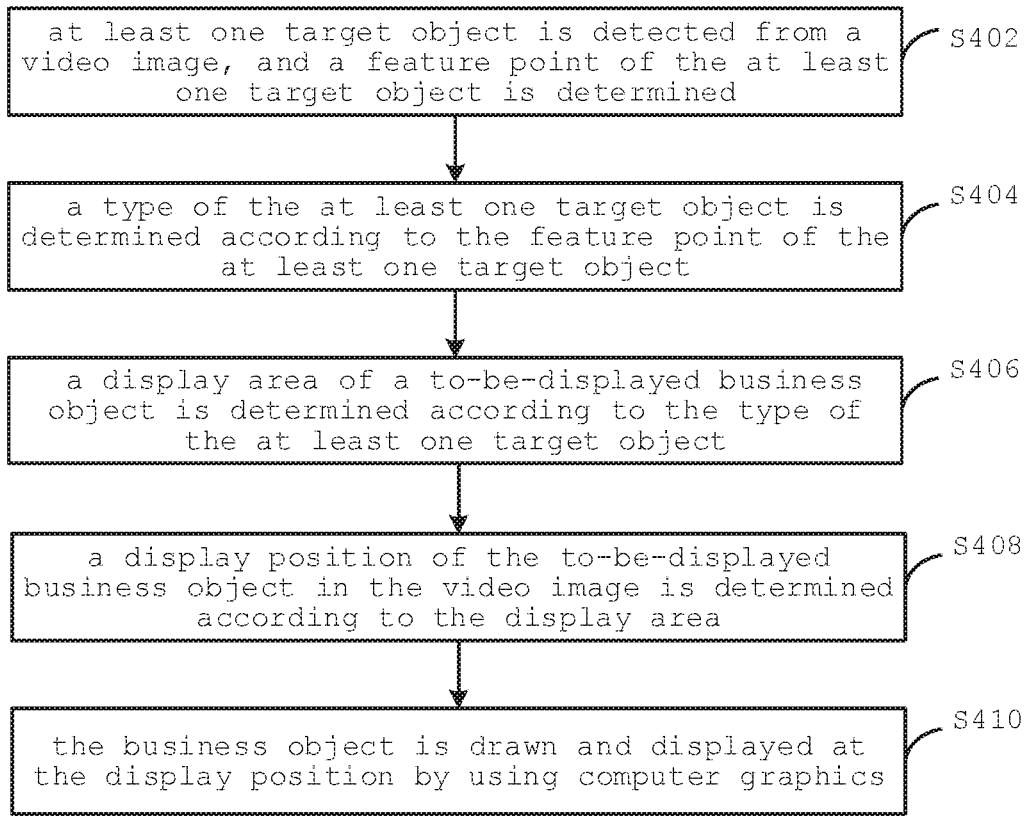
FIG. 4 is a flowchart of still another embodiment according to the method for displaying a business object in a video image of the present disclosure.

FIG. 4 is a flowchart of still another embodiment according to the method for displaying a business object in a video image of the present disclosure. In the present embodiment, the business object being a sticker containing semantic information, and particularly, being an advertisement sticker, is still taken as an example to describe the method for displaying a business object in a video image according to embodiment of the present disclosure.

Referring to FIG. 4, the method for displaying a business object in a video image according to the present embodiment includes the following steps.

In step S402, at least one target object is detected from a video image, and a feature point of the at least one target object is determined.

In an alternative example, step S402 may be performed by a processor invoking a corresponding instruction stored in a memory, and may also be performed by a first determining module 702 run by the processor.

In step S404, a type of the at least one target object is determined according to the feature point of the at least one target object.

Each target object includes a certain feature point, such as a feature point of a human face or a hand, and a boundary point of a background. In the present embodiment, after the feature point of the target object is acquired, the type of the target object may be determined by using related detection, classification or learning methods.

In step S406, a display area of a to-be-displayed business object is determined according to the type of the at least one target object.

For example, if the type of the target object is a human face type, it is determined that the display area of the to-be-displayed business object includes one or more of a hair area, a forehead area, a cheek area, a chin area and a body area except a head of a person in the video image; and/or if the type of the target object is a background type, it is determined that the display area of the to-be-displayed business object includes a background area in the video image; and/or if the type of the target object is a hand type, it is determined that the display area of the to-be-displayed business object includes an area that is centered in an area where the hand is located and is within a set range in the video image; and/or if the type of the target object is an action type, it is determined that the display area of the to-be-displayed business object includes a preset area in the video image.

By taking a video scenario with an anchorman as an example, the scenario generally includes a common scenario of live streaming or short video sharing, a subject of the scenario is generally a person and a simple background, wherein the person generally occupies a larger portion of a screen. For instance, when the video subject is a person, an area concerned mainly by an audience is a face area and body movement of the subject. In order to enable the audience to concern more contents of the advertisement without affecting the subject of the video at the same time, a virtual item containing sememe like the advertisement sticker (i.e., the business object) may be added into a related area of the person in the screen by augmented reality effect. Commercial value is achieved by display effect and display information of the virtual item. By this approach, a major image and the movement of the video subject are kept, and interesting of the video is also increased through a special effect of augmented reality, which is conductive to reducing possible antipathy of the audience aroused by the putting of the advertisement, and attracting the attention of the audience, thereby forming a commercial value.

For instance, in a video streaming scenario, a display area of a business object of a forehead sticker type may be a forehead area of the anchorman, a display area of a business object of a cheek sticker type may be areas of both cheeks of the anchorman, a display area of a business object of another cheek sticker type may be areas of both cheeks of the anchorman and an area above the anchorman's forehead in the background area, a display area of a business object of a chin sticker type may be a chin area of the anchorman, and a display area of a business object of a virtual headwear type may be a hair area of the anchorman and an area in the background. A display area of a business object that is displayed in the background area may be used to display in a situation where the business object is displayed without covering the background, a display area of a business object whose display is triggered by a blinking movement may be an eye area of the anchorman, a display area of a business object whose display is triggered by a kissing movement may be a mouth area of the anchorman, a display area of a business object whose display is triggered by a smiling movement may be multiple areas, a display area of a business object whose display is triggered by a hand waving movement may be a hand area of the anchorman, and a display area of a business object whose display is triggered by a palm-upward movement may be an area above the anchorman's hand.

In step S408, a display position of the to-be-displayed business object in the video image is determined according to the display area.

The determined display area may merely include one area, and may also include a plurality of areas, from which one or more display areas may be determined to draw and display the business object according to the type of the business object.

As an example, when the type of the target object is the human face type, and the type of the business object is the forehead sticker type, it may be determined that the display area of the business object in the video image is a corresponding forehead area, and a central point of the forehead area is served as a center of the display position for drawing and displaying the business object. As another example, when the type of the target object is the human face type, and the type of the business object is a text type, the display area of the business object in the video image may include a body area, a forehead area, a cheek area and a background area and the like, from which one or more areas may be determined to draw and display the business object with a corresponding central point of the area as the center of the display area.

In an alternative example, steps S404 to S408 may be performed by the processor invoking corresponding instructions stored in the memory, and may also be performed by a drawing module 706 run by the processor.

In step S410, the business object is drawn and displayed at the display position by using computer graphics.

In an alternative example, step S410 may be performed by the processor invoking a corresponding instruction stored in the memory, and may also be performed by a second determining module 704 run by the processor.

Alternatively, the business object in the above example may be a sticker in a text form or a picture form, or in a form of a combination of them.

According to the method for displaying a business object in a video image provided in the embodiment, in a video scenario with an anchorman, an appropriate position for putting and displaying the advertisement can be effectively determined, and can be effectively merged with the video broadcasting without extra network resources and system resources of a client, and thus, the putting effect and efficiency of the advertisement is improved without affecting the video watching experience of the user.

In the embodiment as illustrated in FIG. 4, if the business object includes a plurality of associated business objects, in step S406, corresponding display areas of the plurality of to-be-displayed associated business objects are determined according to the type of the at least one target object;

In step S408, corresponding display positions of the plurality of to-be-displayed associated business objects in the video image are determined according to the corresponding display areas of the plurality of to-be-displayed associated business objects. As an example, central points of the display areas are served as central points of the display positions of the business objects for displaying the business objects; as another example, a certain coordinate position in the display area is determined as a central point of the display position, which will not be limited by the embodiment of the present disclosure; and In step S410, the plurality of to-be-displayed associated business objects are respectively drawn at the corresponding display positions by using computer graphics.

According to a method for processing a video image provided by the embodiment, the determination of the display positions of the associated business objects in the video image may be effectively implemented, and thus, the plurality of the associated business objects are respectively drawn at the determined display positions by using computer graphics, thereby implementing the putting and displaying of the associated business objects. The plurality of associated business objects are displayed jointly, and are combined effectively with the video broadcasting, thereby enhancing efficiency and effect of putting and displaying the business objects without extra data transmission, and saving the network resources and the system resources of the client.

Figure 5:
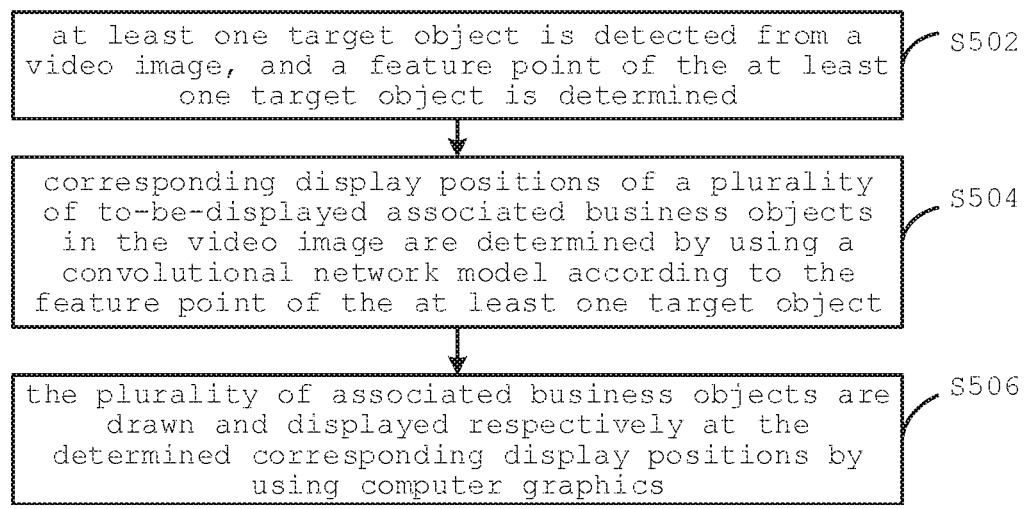
FIG. 5 is a flowchart of still another embodiment according to the method for displaying a business object in a video image of the present disclosure.

FIG. 5 is a flowchart of still another embodiment according to the method for displaying a business object in a video image of the present disclosure. The method for displaying a business object in a video image according to the embodiment may be performed by any device possessing functions of data acquisition, processing and transmission, which includes, but not limited to, an electronic device such as a mobile terminal, a personal computer (PC) or the like. The embodiment is described by taking a business object that includes a plurality of associated business objects as an example, which is also adapted to a single business object. As shown in FIG. 5, the method for displaying a business object in a video image according to the embodiment includes the following steps.

In step S502, at least one target object is detected from a video image, and a feature point of the at least one target object is determined.

In an alternative example, step S502 may be performed by a processor invoking a corresponding instruction stored in a memory, and may also be performed by a first determining module 702 run by the processor.

In step S504, corresponding display positions of a plurality of to-be-displayed associated business objects in the video image are determined by using a convolutional network model according to the feature point of the at least one target object, where the convolutional network model is pre-trained and used to determine a display position of a business object in a video image.

In an alternative example, step S504 may be performed by the processor invoking a corresponding instruction stored in the memory, and may also be performed by a second determining module 704 run by the processor.

In step S506, the plurality of associated business objects are drawn and displayed respectively at the determined corresponding display positions by using computer graphics.

In an alternative example, step S506 may be performed by the processor invoking a corresponding instruction stored in the memory, and may also be performed by a drawing module 706 run by the processor.

According to a method for processing a video image provided by the embodiment, the determination of the display positions of the associated business objects in the video image may be effectively implemented based on the pre-trained convolutional network model, and thus, the plurality of associated business objects are respectively drawn at the determined display positions by using computer graphics, thereby implementing the putting and displaying of the associated business objects. The plurality of associated business objects are displayed jointly, and are combined effectively with the video broadcasting, thereby enhancing efficiency and effect of putting and displaying the business objects without extra data transmission, and saving the network resources and the system resources of the client.

Figure 6:
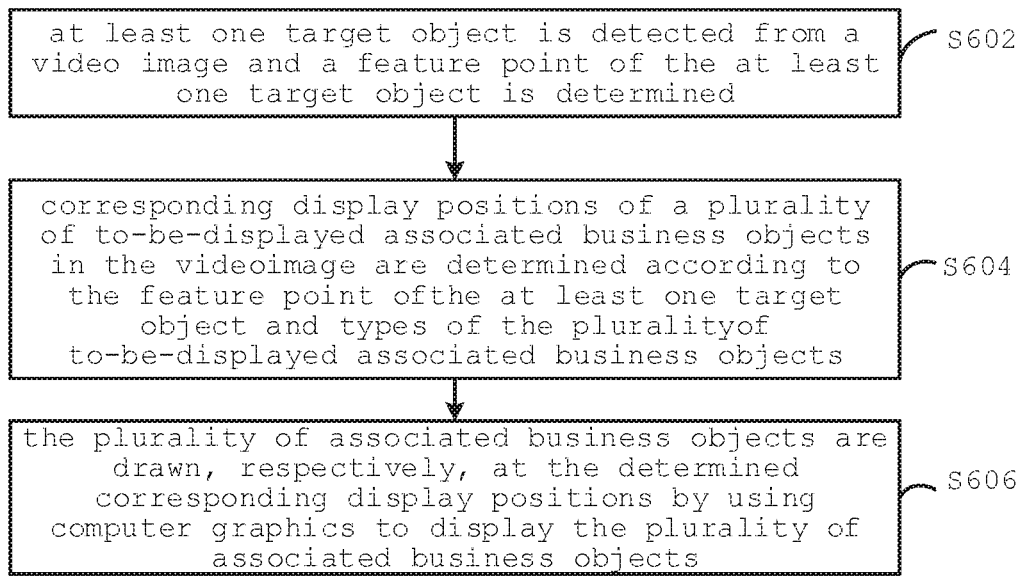
FIG. 6 is a flowchart of still another embodiment according to the method for displaying a business object in a video image of the present disclosure.

FIG. 6 is a flowchart of still another embodiment according to the method for displaying a business object in a video image of the present disclosure. In this embodiment, a plurality of associated business objects are multiple special effects containing semantic information and displaying a given business object theme, or multiple special effects containing semantic information and provided by a given business object provider, or multiple display portions of a given special effect containing semantic information. A video image processing solution provided by this embodiment is described by taking the special effect that is a two-dimensional sticker special effect containing advertisement information as an example, which is also adapted to a single business object. As shown in FIG. 6, the method for displaying a business object in a video image according to this embodiment includes the following steps. In step S602, at least one target object is detected from a video image and a feature point of the at least one target object is determined.

In an alternative example, step S602 may be performed by a processor invoking a corresponding instruction stored in a memory, and may also be performed by a first determining module 702 run by the processor.

In step S604, corresponding display positions of a plurality of to-be-displayed associated business objects in the video image are determined according to the feature point of the at least one target object and types of the plurality of to-be-displayed associated business objects.

Unlike the previous embodiment, when the display positions of the plurality of to-be-displayed associated business objects in the video image are determined, the display positions of the plurality of to-be-displayed associated business objects in the video image are determined not only according to the feature point of the at least one target object, but also according to the types of the to-be-displayed associated business objects. Accordingly, the feature point of the target object may be served as reference to select appropriate display positions for the associated business objects, according to the types of the associated business objects.

In addition, in a situation where the corresponding display positions of the plurality of to-be-displayed associated business objects in the video image are acquired according to the feature point of the at least one target object and the types of the to-be-displayed associated business objects, at least one display position may be selected from the plurality of display positions. For instance, for the text type of the business object, it may be displayed at a background area and may also be displayed at an area of a person, such as a forehead area or a body area.

In step S606, the plurality of associated business objects are drawn, respectively, at the determined corresponding display positions by using computer graphics to display the plurality of associated business objects.

It should be noted that, the associated business objects in the above example may be stickers in a text form or a picture form, or in a form of a combination of them.

According to the video image processing method provided by this embodiment, in comprehensive consideration of the feature point of the target object and the types of the associated business objects, the determination for the display positions of the associated business objects in the video image is implemented, and thus, the plurality of associated business objects are respectively drawn at the corresponding display positions by using computer graphics, thereby implementing the putting and displaying of the associated business objects. The plurality of associated business objects are displayed in a combination thereof, and combine effectively with the video broadcasting to be displayed, which is conductive to enhancing the efficiency and effect of putting and displaying the business objects, does not need any extra data transmission, and then is conductive to saving network resources and system resources of a client.

Any method for displaying a business object in a video image provided by the embodiments of the disclosure may be performed by any appropriate device possessing a data processing function, which includes, but not limited to, a terminal device, a serve and so on. Alternatively, any method for displaying a business object in a video image provided by the embodiments of the disclosure may be performed by the processor. For example, the processor performs any method for displaying a business object in a video image mentioned in the embodiments of the disclosure by invoking corresponding instructions stored in the memory. This will not be repeatedly hereinafter.

It can be understood by those skilled in the art that, the above-described method according to the embodiment of the present disclosure may be implemented in hardware or firmware, or may be implemented as a software or computer code that may be stored in a recording medium such as CD ROM, RAM, floppy disk, hard disk or magneto-optical disk, or as a web downloaded computer code that is originally stored in a remote recording medium or a non-temporary machine-readable medium and will be stored in a local recording medium, so that the method described herein may be processed by such a software that is stored in a recording medium using a general purpose computer, dedicated processor or a programmable or dedicated software (such as ASIC or FPGA). It will be understood that a computer, processor, microprocessor controller or programmable hardware includes a storage component (such as RAM, ROM, flash memory) that may store or receive a software or computer code. When the software or computer code is accessed and executed by the computer, processor or hardware, the processing method as described is implemented. In addition, when the general purpose computer accesses a code for implementing the processing shown here, the execution of the code converts the general purpose computer to a dedicated computer for performing the processing shown here.

Figure 7:
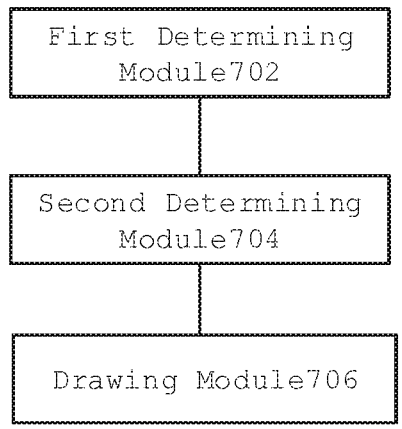
FIG. 7 is a structural block diagram of an embodiment according to an apparatus for displaying a business object in a video image of the present disclosure.

FIG. 7 is a structural block diagram of an embodiment according to an apparatus for displaying a business object in a video image of the present disclosure. The apparatus according to various embodiments of the present disclosure may be used to implement the embodiments according to the method of the present disclosure. As shown in FIG. 7, the apparatus for displaying a business object in a video image according to this embodiment includes:

a first determining module 702, configured to detect at least one target object from a video image, and determine a feature point of the at least one target object;

a second determining module 704, configured to determine a display position of a to-be-displayed business object in the video image according to the feature point of the at least one target object; and a drawing module 706, configured to draw the business object at the display position by using computer graphics.

According to the apparatus for displaying a business object in a video image provided by this embodiment, the target object is detected from the video image and the feature point of the target object is determined, different target objects possess different feature points, and thus, the determined feature point of the target object is served as a basis for determining the display position of the to-be-displayed business object to determine the display position of the to-be-displayed business object, and the business object is drawn at the determined display position so as to display the business object by using computer graphics. When the business object is a to-be-displayed advertisement, on the one hand, the business object that combines with the video broadcasting is drawn at the determined display position by using computer graphics, without transmitting extra advertisement video data irrelevant to a video through a network, which is conductive to saving network resources and system resources of a client; on the other hand, the business object combines closely with the target object in the video image, so that the business object may be displayed in a mode not disturbing an audience, a normal video viewing experience of the audience would not be affected and an antipathy of the audience is difficult to be aroused, which is conductive to improving the putting efficiency and effect of the business object and achieving the expected display efficiency and effect.

In an alternative example of various embodiments according to the apparatus for displaying a business object in a video image of the present disclosure, the second determining module 704 may be implemented by a convolutional network model being pre-trained and used to determine display positions of business objects in video images. That is, the second determining module 704 is configured to determine the display position of the to-be-displayed business object in the video image, according to the feature point of the at least one target object by using the convolutional network model being pre-trained and used to determine display positions of business objects in video images.

Figure 8:
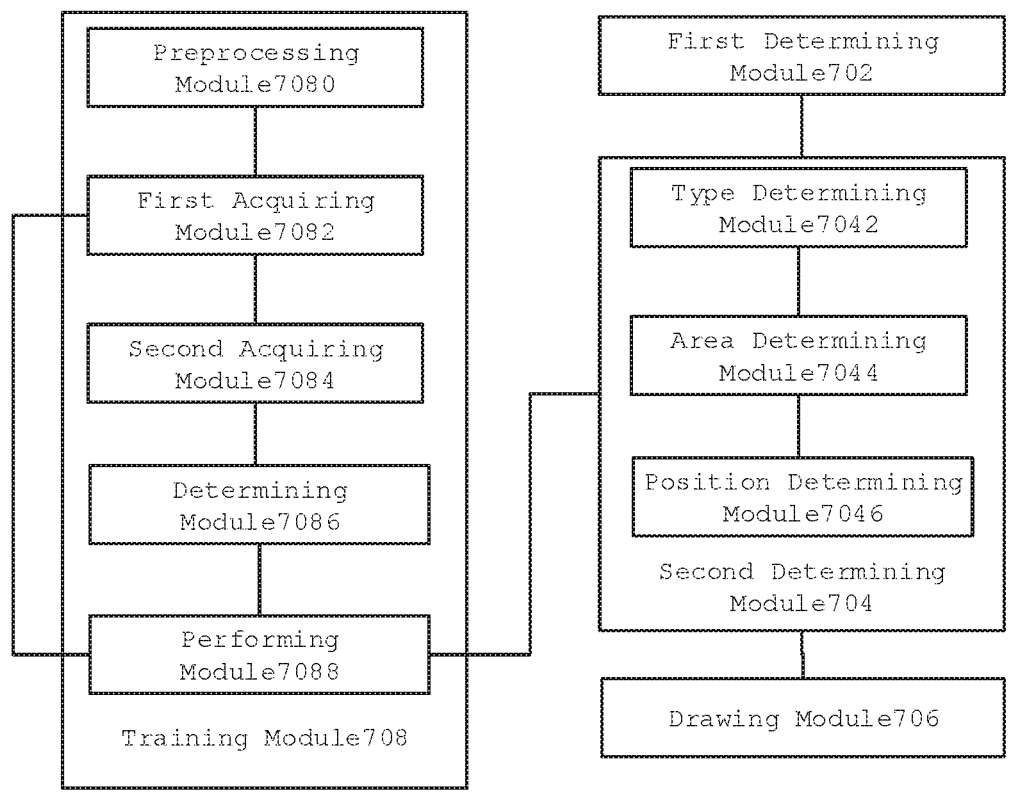
FIG. 8 is a structural block diagram of another embodiment according to the apparatus for displaying a business object in a video image of the present disclosure.

FIG. 8 is a structural block diagram of another embodiment according to the apparatus for displaying a business object in a video image of the present disclosure. As shown in FIG. 8, as compared with the embodiment illustrated in FIG. 7, the apparatus in this embodiment further includes a training module 708, which is configured to pre-train the above convolutional network model. In an alternative example, the training module 708 includes:

a first acquiring module 7082, configured to acquire a feature vector of a business object sample image to be trained through the convolutional network model, wherein the feature vector contains information of the target object and position information and/or confidence information of the business object in the business object sample image to be trained;

a second acquiring module 7084, configured to perform convolution processing on the feature vector through the convolutional network model, to acquire a convolution result of the feature vector;

a determining module 7086, configured to respectively determine whether corresponding information of the target object and corresponding position information and/or confidence information of the business object in the business object sample image to be trained meet a convergence condition; and a performing module 7088, configured to complete training the convolutional network model if the determining result of the determining module 7086 is that the convergence condition is met; and adjust a parameter of the convolutional network model according to the convolution result of the feature vector if the determining result of the determining module 7086 is that the convergence condition is not met, so as to allow the training module 708 to perform an iterative training for the convolutional network model according to the adjusted parameter of the convolutional network model, until the convolution result of the feature vector after the iterative training meets the convergence condition.

Alternatively, the determining module 7086 may include: a first determining module, configured to acquire the corresponding position information of the business object in the convolution result of the feature vector; calculate a first distance between a position indicated by the corresponding position information of the business object and a preset standard position using a first loss function; and determine whether the corresponding position information of the business object meets the convergence condition according to the first distance; and/or a second determining module, configured to acquire the corresponding confidence information of the business object in the convolution result of the feature vector; calculate a second distance between a confidence indicated by the corresponding confidence information of the business object and a preset standard confidence using a second loss function; and determine whether the corresponding confidence information of the business object meets the convergence condition according to the second distance.

Alternatively, the first loss function may be a function calculating a Euclidean distance between the position indicated by the corresponding position information of the business object and the preset standard position; and/or the second loss function may be a function calculating a Euclidean distance between the confidence indicated by the corresponding confidence information of the business object and the preset standard confidence.

Alternatively, the preset standard position may be an average position that is acquired after the position of the business object in the business object sample image to be trained is averaged, and/or, the preset standard confidence may be an average confidence that is acquired after the confidence of the business object in the business object sample image to be trained is averaged.

Alternatively, the training module 708 may further include: a preprocessing module 7080, configured to acquire a plurality of business object sample images before the first acquiring module 7082 acquires the feature vector of the business object sample image to be trained, wherein each of the business object sample images contains annotation information of the business object; determine the position of the business object according to the annotation information and determine whether a distance between the determined position of the business object and a preset position is less than or equal to a set threshold value; and determine the business object sample image corresponding to the business object having the distance between the determined position and the preset position being less than or equal to the set threshold value, as the business object sample image to be trained.

Alternatively, when determining the position of the business object according to the annotation information and determining whether the distance between the determined position of the business object and the preset position is less than or equal to the set threshold value, the preprocessing module 7080 determines a central position of the business object according to the annotation information; and determines whether a variance between the central position and the preset position is less than or equal to a set threshold value.

Alternatively, the second determining module 704 may include: a type determining module 7042, configured to determine a type of the at least one target object according to information of the feature point of the at least one target object; an area determining module 7044, configured to determine a display area of the to-be-displayed business object according to the type of the at least one target object; and a position determining module 7046, configured to determine the display position of the to-be-displayed business object in the video image according to the display area.

Alternatively, the area determining module 7044 may include: a first area determining module, configured to determine that the display area of the to-be-displayed business object includes one or more of a hair area, a forehead area, a cheek area, a chin area and a body area except a head of a person in the video image, when the type of the at least one target object is a human face type; and/or a second area determining module, configured to determine that the display area of the to-be-displayed business object includes a background area in the video image, when the type of the at least one target object is a background type; and/or a third area determining module, configured to determine that the display area of the to-be-displayed business object includes an area centered by an area where a hand is located, and in a set range in the video image, when the type of the at least one target object is a hand type; and/or a fourth area determining module, configured to determine that the display area of the to-be-displayed business object includes a preset area in the video image, when the type of the target object is an action type.

Alternatively, a movement corresponding to the action type includes at least one of blinking, mouth opening, nodding, head shaking, kissing, smiling, hand waving, scissors hand, first clenching, palm-up, thumbs-up, a shooting hand, a V hand, an Ok hand.

Alternatively, the second determining module 704 is configured to determine the display position of the to-be-displayed business object in the video image according to the feature point of the at least one target object and the type of the to-be-displayed business object.

Alternatively, the second determining module 704 is configured to acquire a plurality of display positions of the to-be-displayed business object in the video image, according to the feature point of the at least one target object and the type of the to-be-displayed business object; and select at least one display position as the display position of the to-be-displayed business object in the video image from the plurality of display positions.

Alternatively, for example, the type of the business object may include, but not limited to, one or more of: a forehead sticker type, a cheek sticker type, a chin sticker type, a virtual hat type, a virtual clothing type, a virtual makeup type, a virtual headwear type, a virtual hair accessory type, a virtual jewelry type, a background type, a virtual pet type, and a virtual container type.

Alternatively, the second determining module 704 is configured to acquire a target display position corresponding to the feature point of the at least one target object from a pre-stored corresponding relationship between the feature point of the target object and the display position; and determine the acquired target display position as the display position of the to-be-displayed business object in the video image.

Alternatively, the business object may be a special effect containing semantic information, and the video image may be a live streaming video image.

Alternatively, the special effect containing semantic information may include at least one of the following forms of special effect containing advertisement information: a two-dimensional sticker special effect or a three-dimensional special effect and a particle special effect.

In an alternative example of various embodiments according to the apparatus of the present disclosure, the business object may include a plurality of associated business objects. Accordingly, the second determining module 704 is configured to determine corresponding display positions of a plurality of to-be-displayed associated business objects in the video image according to the feature point of the at least one target object; and the drawing module 706 is configured to respectively draw the plurality of associated business objects at the corresponding display positions by using computer graphics.

In alternative example, the plurality of associated business objects may include, but not limited to, one or more of: multiple special effects containing semantic information and displaying a given business object theme, multiple display portions of a given special effect containing semantic information, and multiple special effects containing semantic information and provided by a given business object provider. For example, the special effect may include any one of the two-dimensional sticker special effect, three-dimensional special effect and particle special effect containing the advertisement information. In addition, other forms of business objects are also adapted to the video image processing solution provided by the embodiments of the present disclosure.

For example, the corresponding display positions may include one or more of: the hair area, the forehead area, the cheek area, the chin area and the body area except the head of the person in the video image, the background area in the video image, the area centered by the area where the hand is located and in the set range in the video image and the preset area in the video image.

The apparatus for displaying a business object in a video image according to various embodiments of the present disclosure may be configured to implement the various embodiments according to the method for displaying a business object in a video image, and possess corresponding beneficial effects of the embodiments according to the method, which will not be repeatedly described here.

In addition, the apparatus for displaying a business object in a video image according to various embodiments of the present disclosure may be provided in an appropriate electronic device, such as a mobile terminal, a PC and a server.

Figure 9:
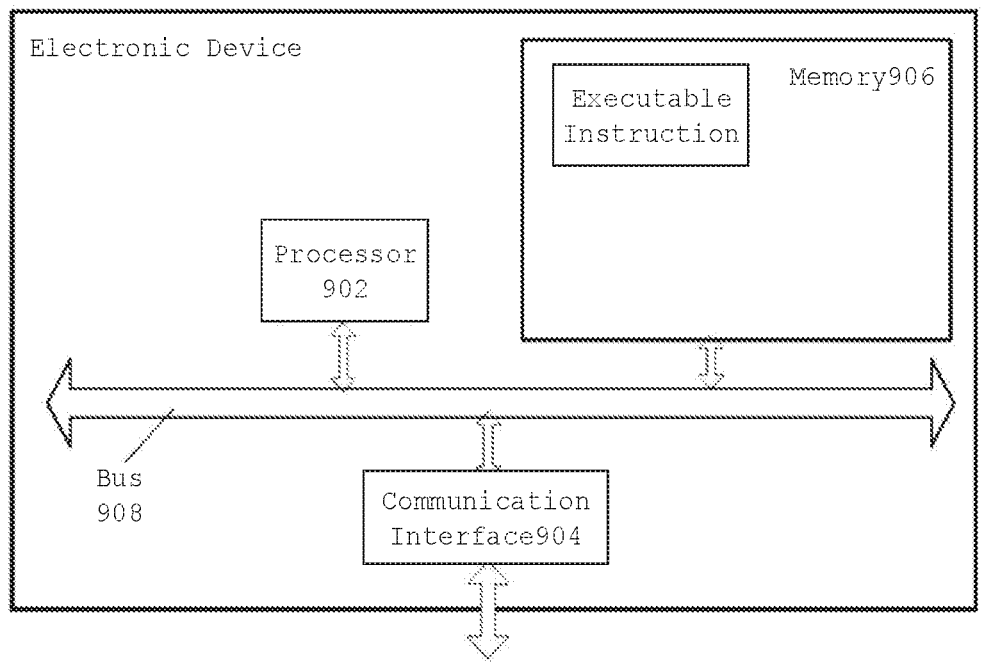
FIG. 9 is a schematic structural diagram of an embodiment according to an electronic device of the present disclosure.

FIG. 9 is a schematic structural diagram of an embodiment according to an electronic device of the present disclosure. The embodiments of the present disclosure do not limit an implementation of the electronic device. As shown in FIG. 9, the electronic device may include: a processor 902, a communication interface 904, a memory 906 and a communication bus 908.

The processor 902, the communication interface 904 and the memory 906 communicate with each other via the communication bus 908.

The communication interface 904 is used to communicate with a network element of other devices, such as other clients or servers.

The processor 902 may be a central processing unit (CPU), or a specific integrated circuit (Application Specific Integrated Circuit, ASIC), or configured to be one or more integrated circuits that implement the embodiments of the present disclosure, or a Graphics Processing Unit (GPU). One or more processors included in a terminal device may be a given type of processor, for example, one or more CPUs or one or more GPUs, and may also be different types of processors, for example, one or more CPUs and one or more GPUs.

The memory 906 is used to store an executable instruction, and this executable instruction causes the processor 902 to perform operations corresponding to the method for displaying a business object in a video image according to any embodiment of the present disclosure. The memory 906 may include a high speed random access memory (RAM), and may further include a non-volatile memory, for example, at least one disk memory. As will be appreciated by one skilled in the art, the present disclosure may be embodied as a computer program product. Accordingly, the present disclosure may take the form of an entirely hardware embodiment, an entirely software embodiment (including firmware, resident software, micro-code, etc.) or an embodiment combining software and hardware. Furthermore, the present disclosure may take the form of a computer program product embodied in any tangible medium of expression having a computer-usable program embodied in the medium.

Figure 10:
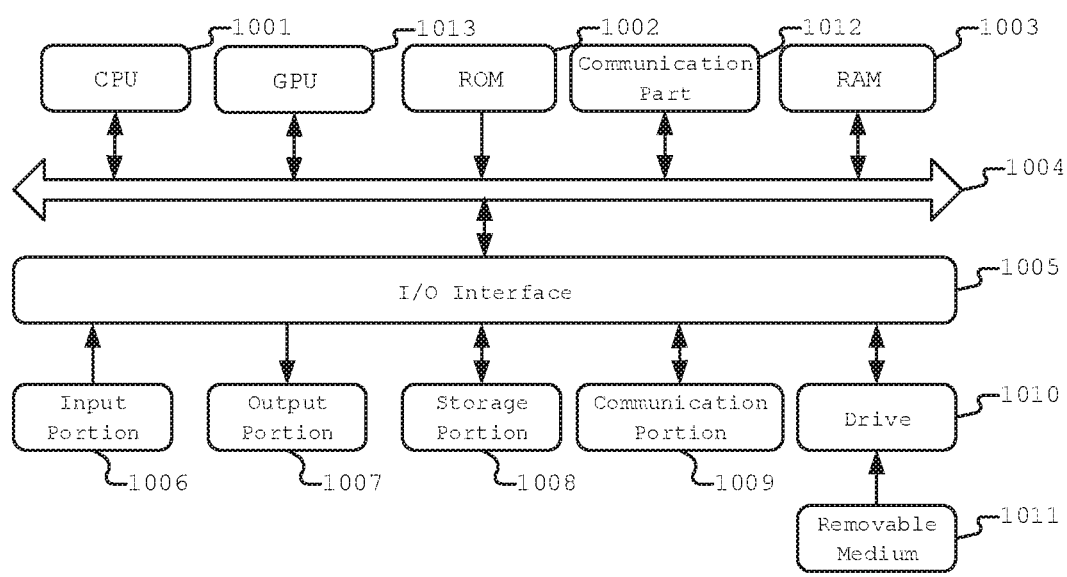
FIG. 10 is a schematic structural diagram of another embodiment according to the electronic device of the present disclosure.

FIG. 10 is a schematic structural diagram of another embodiment according to the electronic device of the present disclosure. Referring to FIG. 10, which illustrates the schematic structural diagram of the electronic device that is adapted to implement a terminal device or a serve according to embodiments of the present disclosure. As shown in FIG. 10, this electronic device includes one or more processors, a communication part and so on. The one or more processors, such as one or more central processing units (CPU) 1001 and/or one or more graphics processing units (GPU) 1013, may perform various appropriate actions and processing, according to executable instructions stored in a read-only memory (ROM) 1002, or executable instructions loaded from a storage portion 1008 to a random access memory (RAM) 1003. The communication part 1012 may include, but not limited to, a network card, the network card may include, but not limited to, an IB (Infiniband) network card, the processor may communicate with the read-only memory 1002 and/or the random access memory 1003 to execute the executable instruction, connect with the communication part 1012 via a bus 1004, and communicate with other target devices through the communication part 1012, thereby completing operations corresponding to the method for displaying a business object in a video image provided by any embodiment of the present disclosure. For instance, the operations include: detecting at least one target object from a video image, and determining a feature point of the at least one target object; determining a display position of a to-be-displayed business object in the video image according to the feature point of the at least one target object; and drawing the business object at the display position by using computer graphics.

In addition, RAM 1003 may further store various programs and data required by operations of an apparatus. CPU 1001, ROM 1002 and RAM 1003 connect with each other via the bus 1004. In a situation where RAM 1003 is provided, ROM 1002 is an alternative module. RAM 1003 stores executable instructions, or writes the executable instructions into ROM 1002 at run time, and the executable instructions cause the processor 1001 to perform the operations corresponding to the method for displaying a business object in a video image. An Input/Output (I/O) interface 1005 is also connected to the bus 1004. The communication part 1012 may be configured to be integrated, and may also be configured to include a plurality of sub-modules (e.g., a plurality of IB network cards) and be on the bus link.

The following components are connected to the I/O interface 1005: an input portion 1006 including a keyboard, a mouse etc.; an output portion 1007 including a cathode ray tube (CRT), a liquid crystal display device (LCD), a speaker etc.; the storage portion 1008 including a hard disk and the like; and a communication portion 1009 including a network interface card, such as a LAN card and a modem. The communication portion 1009 performs communication processing via a network, such as the Internet. A driver 1010 is also connected to the I/O interface 1005 as required. A removable medium 1011, such as a magnetic disk, an optical disk, a magneto-optical disk, and a semiconductor memory, may be installed on the driver 1010, to facilitate the retrieval of a computer program from the removable medium. 1011, and the installation thereof on the storage portion 1008 as needed.

It should be noted that, the structure as illustrated in FIG. 10 is merely an alternative implementation, and in the practical process, the number and types of the components in FIG. 10 may be selected, reduced, added or replaced according to actual requirements; and in the configurations of different functional components, the implementation, such as a separated configuration or an integrated configuration may be adopted, for example, the GPU and CPU may be separately configured or the GPU may be integrated onto the CPU, and the communication part may be separately configured, and may also be integrated onto the CPU or the GPU. These alternative implementations fall within the protection extent disclosed by the present disclosure.

In particular, according to the embodiments of the present disclosure, the processes described above with reference to the flow charts may be implemented in a computer software program. For example, the embodiments of the present disclosure include a computer program product, which includes a computer program that is tangibly embedded in a machine-readable medium. The computer program includes a program code for performing the method as illustrated in the flow charts. The program code may include instructions corresponding to steps of the method provided by the embodiments of the present disclosure. For example, the steps include: detecting at least one target object from a video image, and determining a feature point of the at least one target object; determining a display position of a to-be-displayed business object in the video image according to the feature point of the at least one target object; and drawing the business object at the display position by using computer graphics.

In addition, the embodiments of the present disclosure further provide a computer program, which includes a computer readable code, and the program code includes a computer operating instruction. The processor in the device executes the instruction for implementing each step in the method for displaying a business object in a video image according to any embodiment of the present disclosure, when the computer readable codes are run on the device.

In addition, the embodiments of the present disclosure further provide a computer readable storage medium for storing computer readable instructions. The operation of each step in the method for displaying a business object in a video image according to any embodiment of the present disclosure is implemented when the instructions are executed.

In the embodiments of the present disclosure, when the computer program and the computer readable instructions are executed, the implementation of each step may refer to the corresponding description in the corresponding step and module in the preceding embodiments, which will not be repeatedly here. It can be clearly understood by those skilled in the art that, for the convenience and concision of the description, the specific working processes of the device and modules described above may refer to the description of the corresponding processes in the preceding embodiments of the method, which will not be repeatedly here.

Each embodiment in the specification is described in a progressive manner, and each embodiment focuses on differences from other embodiments, with the same or similar parts of each embodiment being referred to each other. For the embodiments of an apparatus, a device, a program, a storage medium etc., it is relatively simple to describe because of their basic correspondence to the method embodiments; and for relevant parts, see partial description of the method embodiments.

It should be noted that, as required by the implementation, each component/step described in the embodiments of the present disclosure may be split into more components/steps, two or more components/steps or some of operations of the component/step may be combined into a new component/step to achieve the purposes of the embodiments of the present disclosure. Those skilled in the art may be conscious of that the method and apparatus according to the present disclosure can be implemented in many ways. For instance, the method and apparatus according to the present disclosure may be implemented by software, hardware, firmware or any combination of the software, the hardware and the firmware. Whether these functions are performed by the hardware or by the software depends on specific applications and design constraints of the technical solution. For each specific application, the professionals may use different methods to implement the described functions, however, this implementation shall not go beyond the scope of the embodiments of the present disclosure. The order of the steps in the method is merely for the description, and the steps in the method of the present disclosure are not limited to the order specifically described above, unless otherwise noted in other ways. In addition, in some embodiments, the present disclosure may also be implemented in programs recorded in a recording medium, and these programs include machine-readable instructions for implementing the method according to the present disclosure. Accordingly, the present disclosure also covers the recording medium storing the programs which are used to perform the method according to the present disclosure.

The above implementations are only used to illustrate the embodiments of the present application rather than limiting the embodiments of the present application, those of ordinary skills in related technical fields may also make various changes and variations without departing from the scope of the embodiments of the present application, so that all equivalent technical schemes also fall within the scope of the embodiments of the present application, and the scope of patent protection of the embodiments of the present application shall be limited by the claims.

What is claimed is:

1. A method for displaying a business object in a video image, comprising:

detecting at least one object from the video image, determining an object performing an action as a target object from the at least one object, and determining feature points of the target object by processing at least part of the video image, the features points of the target object being separated points on a contour of the target object;

determining a display position of a to-be-displayed business object in the video image according to the feature points on the contour of the target object by using a convolutional network model pre-trained by acquiring a feature vector of a business object sample image by the convolutional network model, the feature vector including information of the target object and position information and/or confidence information of a business object in the business object sample image; and drawing the to-be-displayed business object at the display position by using computer graphics to display the to-be-displayed business object together with the target object, wherein the target object is a human body part performing the action, wherein the determining the display position of the to-be-displayed business object in the video image according to the feature points on the contour of the target object comprises: determining the human body part as the display position based on feature points on the contour of the human body part.

2. The method according to claim 1, wherein pre-training of the convolutional network model further comprises:

performing convolution processing on the feature vector by using the convolutional network model to acquire a convolution result of the feature vector; and adjusting a parameter of the convolutional network model according to the convolution result of the feature vector.

3. The method according to claim 2, wherein the adjusting the parameter of the convolutional network model according to the convolution result of the feature vector comprises:

acquiring the corresponding position information of the business object in the convolution result of the feature vector; calculating a first distance between a position indicated by the corresponding position information of the business object and a preset standard position using a first loss function; and adjusting the parameter of the convolutional network model according to the first distance; and/or acquiring the corresponding confidence information of the business object in the convolution result of the feature vector; calculating a second distance between a confidence indicated by the corresponding confidence information of the business object and a preset standard confidence using a second loss function; and adjusting the parameter of the convolutional network model according to the second distance.

4. The method according to claim 1, wherein the determining a display position of a to-be-displayed business object in the video image according to the feature points on the contour of the target object comprises:

determining a type of the target object based on the feature points of the target object;

determining a display area of the to-be-displayed business object according to the type of the target object; and determining the display position of the to-be-displayed business object in the video image according to the display area.

5. The method according to claim 1, wherein the to-be-displayed business object comprises a plurality of associated business objects;

the determining a display position of a to-be-displayed business object in the video image comprises determining corresponding display positions of a plurality of to-be-displayed associated business objects in the video image; and the drawing the to-be-displayed business object at the display position by using computer graphics comprises drawing the plurality of associated business objects at the corresponding display positions by using computer graphics, respectively.

6. The method according to claim 5, wherein the plurality of associated business objects comprise any one or more of: multiple special effects containing semantic information that are used for displaying a same business object theme, multiple display portions of a same special effect containing semantic information, and multiple special effects containing semantic information that are provided by a same business object provider.

7. The method according to claim 1, wherein the determining an object performing an action as a target object from the at least one object comprises: determining a second human body part with a gesture as the target object.

8. The method according to claim 1, wherein the to-be-displayed business object has a same shape as the human body part.

9. The method according to claim 1, wherein the to-be-displayed business object is an article for being placed on the human body part.

10. An apparatus for displaying a business object in a video image, comprising:

a processor; and a memory storing instructions, the instructions when executed by the processor, cause the processor to perform operations, the operations comprising:

detecting at least one object from the video image, determining an object performing an action as a target object from the at least one object, and determining feature points of the target object by processing at least part of the video image, the features points of the target object being separated points on a contour of the target object;

determining a display position of a to-be-displayed business object in the video image according to the feature points on the contour of the target object by using a convolutional network model pre-trained by acquiring a feature vector of a business object sample image by the convolutional network model, the feature vector including information of the target object and position information and/or confidence information of a business object in the business object sample image; and drawing the to-be-displayed business object at the display position by using computer graphics to display the to-be-displayed business object together with the target object, wherein the target object is a human body part performing the action, wherein the determining the display position of the to-be-displayed business object in the video image according to the feature points on the contour of the target object comprises: determining the human body part as the display position based on feature points on the contour of the human body part.

11. The apparatus according to claim 10, wherein the operations further comprise pre-training the convolutional network model,
wherein the pre-training the convolutional network model comprises:
performing convolution processing on the feature vector to acquire a convolution result of the feature vector; and
adjusting a parameter of the convolutional network model according to the convolution result of the feature vector.

12. The apparatus according to claim 11, wherein the adjusting the parameter of the convolutional network model according to the convolution result of the feature vector comprises:
acquiring the corresponding position information of the business object in the convolution result of the feature vector; calculating a first distance between a position indicated by the corresponding position information of the business object and a preset standard position using a first loss function; and adjusting the parameter of the convolutional network model according to the first distance; and/or
acquiring the corresponding confidence information of the business object in the convolution result of the feature vector; calculating a second distance between a confidence indicated by the corresponding confidence information of the business object and a preset standard confidence using a second loss function; and adjusting the parameter of the convolutional network model according to the second distance.

13. The apparatus according to claim 10, wherein the determining a display position of a to-be-displayed business object in the video image according to the feature points on the contour of the target object comprises:
determining a type of the target object based on the feature points of the target object;
determining a display area of the to-be-displayed business object according to the type of the target object; and
determining the display position of the to-be-displayed business object in the video image according to the display area.

14. The apparatus according to claim 10, wherein the to-be-displayed business object comprises a plurality of associated business objects;
the determining a display position of a to-be-displayed business object in the video image according to the feature points on the contour of the target object comprises: determining corresponding display positions of a plurality of to-be-displayed associated business objects in the video image according to the feature points on the contour of the target object; and
the drawing the to-be-displayed business object at the display position by using computer graphics comprises: drawing the plurality of associated business objects at the corresponding display positions by using computer graphics, respectively.

15. A non-transitory computer program product, comprising a computer readable code, wherein when the computer readable code is run on a device, a processor in the device executes an instruction for realizing the method for displaying a business object in a video image according to claim 1.

* * * * *